United States Patent
Ishihara et al.

(10) Patent No.: US 6,683,707 B2
(45) Date of Patent: Jan. 27, 2004

(54) SCANNING OPTICAL APPARATUS AND IMAGE FORMING APPARATUS USING THE SAME

(75) Inventors: Keiichiro Ishihara, Tochigi (JP); Hiroshi Sato, Tochigi (JP); Manabu Kato, Tochigi (JP); Hidekazu Shimomura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 10/179,172

(22) Filed: Jun. 26, 2002

(65) Prior Publication Data

US 2003/0043442 A1 Mar. 6, 2003

(30) Foreign Application Priority Data

Jul. 6, 2001 (JP) .......................... 2001/206363

(51) Int. Cl.[7] .............................................. G02B 26/08
(52) U.S. Cl. .................. 359/205; 359/217; 347/256
(58) Field of Search ................ 359/205, 206, 359/207, 212, 216, 217, 218, 219; 347/256, 258, 259

(56) References Cited

U.S. PATENT DOCUMENTS

| 5,111,219 A | 5/1992 | Makino ................ 346/108 |
| 5,557,446 A | 9/1996 | Kato ..................... 359/206 |
| 5,648,865 A * | 7/1997 | Iizuka ................... 359/208 |
| 5,883,732 A | 3/1999 | Takada et al. ........... 359/207 |
| 2002/0149668 A1 | 10/2002 | Kato ..................... 347/244 |
| 2003/0025784 A1 | 2/2003 | Sato et al. .............. 347/258 |
| 2003/0048352 A1 | 3/2003 | Kato et al. .............. 347/258 |
| 2003/0053185 A1 | 3/2003 | Shimomura et al. ....... 359/197 |

FOREIGN PATENT DOCUMENTS

| JP | 4-50908 | 2/1992 |
| JP | 9-33850 | 2/1997 |

* cited by examiner

*Primary Examiner*—Mark A. Robinson
(74) *Attorney, Agent, or Firm*—Fitzpatrick, Cella, Harper & Scinto

(57) ABSTRACT

An object of the present invention is to provide a scanning optical apparatus that is capable of suppressing, to a minute amount, scanning line bending caused by rotational decentration of a single lens that is a scanning optical system, and to provide an image forming apparatus using the optical scanning apparatus. To achieve the stated object, with the technique of the present invention, a single lens is used as a scanning optical system and the surface shape of the single lens is set so that a direction of scanning line bending in the sub scanning direction occurring when an incident surface of the single lens is rotationally decenter about an axis parallel to the main scanning direction is opposite to a direction of scanning line bending in the sub scanning direction occurring when an exit surface is rotationally decenter about the axis parallel to the main scanning direction.

20 Claims, 17 Drawing Sheets

FIG. 3

DESIGN DATA

| | | | SURFACE SHAPE OF TORIC LENS (MAIN SCANNING) | | | SURFACE SHAPE OF TORIC LENS (SUB SCANNING) | | |
|---|---|---|---|---|---|---|---|---|
| | | | | FIRST SURFACE | SECOND SURFACE | | FIRST SURFACE | SECOND SURFACE |
| WAVELENGTH, REFRACTIVE INDEX | | | | | | | | |
| WAVELENGTH USED | λ (mm) | 780 | R | 4.27400E+02 | −9.47135E+01 | r | ∞ | −2.35613E+01 |
| REFRACTIVE INDEX OF TORIC LENS | nd | 1.53064 | K | 3.71366E+00 | 0.00000E+00 | D2s | 0.00000E+00 | 6.33197E−05 |
| ABBE NUMBER | νd | 55.5 | B4 | −1.85091E−07 | 0.00000E+00 | D4s | 0.00000E+00 | 2.50292E−09 |
| LIGHT RAY ANGLE | | | B6 | 3.44576E−11 | 0.00000E+00 | D6s | 0.00000E+00 | −3.34091E−13 |
| ANGLE OF INCIDENCE ON POLYGON | θp | 90.0 | B8 | −6.82420E−15 | 0.00000E+00 | D8s | 0.00000E+00 | 1.43974E−16 |
| POLYGON MAXIMUM EXIT ANGLE | θe | 40.9 | B10 | 7.10650E−19 | 0.00000E+00 | D10s | 0.00000E+00 | 0.00000E+00 |
| LAYOUT | | | | | | D2e | 0.00000E+00 | 6.33197E−05 |
| POLYGON SURFACE-FIRST SURFACE OF TORIC LENS | e1 | 51.45 | | | | D4e | 0.00000E+00 | 2.50292E−09 |
| TORIC LENS CENTRAL THICKNESS | d1 | 17.90 | | Suffics s INDICATE LASER SIDE | | D6e | 0.00000E+00 | −3.34091E−13 |
| SECOND SURFACE OF TORIC LENS-SURFACE TO BE SCANNED | e2 | 147.28 | | Suffics e INDICATE SIDE OPPOSITE TO LASER | | D8e | 0.00000E+00 | 1.43974E−16 |
| EFFECTIVE SCANNING WIDTH ON SURFACE TO BE SCANNED | W | 214.00 | | | | D10e | 0.00000E+00 | 0.00000E+00 |
| OTHERS | | | | | | | | |
| FOCAL LENGTH OF TORIC LENS IN MAIN SCANNING DIRECTION | fm | 149.67 | | | | | | |
| POLYGON SURFACE-SURFACE TO BE SCANNED | L | 216.63 | | | | POWER RATIO IN SUB SCANNING DIRECTION | | |
| L/fm | a | 1.45 | | | | φs2/φs | | 1.000 |
| INTERVAL OF PRINCIPAL PLANES | HH' | 11.88 | | | | | | |
| (L−HH')/fm | b | 1.37 | | | | | | |

FIG. 9

DESIGN DATA

| WAVELENGTH, REFRACTIVE INDEX | | | SURFACE SHAPE OF TORIC LENS (MAIN SCANNING) | | | SURFACE SHAPE OF TORIC LENS (SUB SCANNING) | | |
|---|---|---|---|---|---|---|---|---|
| | | | | FIRST SURFACE | SECOND SURFACE | | FIRST SURFACE | SECOND SURFACE |
| WAVELENGTH USED | λ (mm) | 780 | R | 2.42364E+02 | −1.14019E+02 | r | 2.19972E+02 | −2.07641E+01 |
| REFRACTIVE INDEX OF TORIC LENS | nd | 1.53064 | K | −4.82223E+01 | 4.3842E+00 | D2s | | 1.82916E−04 |
| ABBE NUMBER | νd | 55.5 | B4 | −5.14599E−07 | | D4s | | −2.34850E−08 |
| LIGHT RAY ANGLE | | | B6 | 2.81558E−11 | | D6s | | −1.50404E−11 |
| ANGLE OF INCIDENCE ON POLYGON | θp | −90.0 | B8 | −1.63776E−14 | | D8s | | 2.47392E−14 |
| POLYGON MAXIMUM EXIT ANGLE | θe | 42.0 | B10 | −8.81445E−18 | | D10s | | −7.50000E−18 |
| LAYOUT | | | | | | D2e | | 1.51171E−04 |
| POLYGON SURFACE–TORIC LENS | e1 | 39.4 | | | | D4e | | 2.80324E−08 |
| TORIC LENS CENTRAL THICKNESS | d1 | 14.0 | Suffixes s INDICATE LASER SIDE | | | D6e | | −2.07820E−11 |
| SECOND SURFACE OF TORIC LENS–SURFACE TO BE SCANNED | e2 | 146.4 | Suffixes e INDICATE SIDE OPPOSITE TO LASER | | | D8e | | −4.61796E−15 |
| OTHERS | | | | | | D10e | | 5.69401E−18 |
| FOCAL LENGTH OF TORIC LENS IN MAIN SCANNING DIRECTION | fm | 149.9 | | | | POWER RATIO IN SUB SCANNING DIRECTION | | |
| POLYGON SURFACE–SURFACE TO BE SCANNED | L | 199.8 | | | | φs2/φs | | |
| L/fm | a | 13.3 | | | | | | 0.932 |

FIG. 14

DESIGN DATA

| WAVELENGTH, REFRACTIVE INDEX | | | | SURFACE SHAPE OF TORIC LENS (MAIN SCANNING) | | | SURFACE SHAPE OF TORIC LENS (SUB SCANNING) | | |
|---|---|---|---|---|---|---|---|---|---|
| | | | | | FIRST SURFACE | SECOND SURFACE | | FIRST SURFACE | SECOND SURFACE |
| WAVELENGTH USED | λ (mm) | 780 | R | | 4.27400E+02 | -9.47135E+01 | r | 2.50000E+02 | -2.51836E+01 |
| REFRACTIVE INDEX OF TORIC LENS | nd | 1.53064 | K | | 3.71366E+00 | 0.00000E+00 | D2s | 0.00000E+02 | 8.57437E-05 |
| ↑ ABBE NUMBER | νd | 55.5 | B4 | | -1.85091E-07 | 0.00000E+00 | D4s | 0.00000E+00 | 6.32619E-09 |
| LIGHT RAY ANGLE | | | B6 | | 3.44576E-11 | 0.00000E+00 | D6s | 0.00000E+00 | 7.63855E-13 |
| ANGLE OF INCIDENCE ON POLYGON | θp | 90.0 | B8 | | -6.82420E-15 | 0.00000E+00 | D8s | 0.00000E+00 | 1.67725E-18 |
| POLYGON MAXIMUM EXIT ANGLE | θe | 40.9 | B10 | | 7.10650E-19 | 0.00000E+00 | D10s | 0.00000E+00 | 0.00000E+00 |
| LAYOUT | | | | | | | D2e | 0.00000E+00 | 8.57437E-05 |
| POLYGON SURFACE-FIRST SURFACE OF TORIC LENS | e1 | 51.45 | | | | | D4e | 0.00000E+00 | 6.32619E-09 |
| TORIC LENS CENTRAL THICKNESS | d1 | 17.90 | | | | | D6e | 0.00000E+00 | 7.63855E-13 |
| SECOND SURFACE OF TORIC LENS-SURFACE TO BE SCANNED | e2 | 147.28 | | | | | D8e | 0.00000E+00 | 1.67725E-18 |
| EFFECTIVE SCANNING WIDTH ON SURFACE TO BE SCANNED | W | 214.00 | | | | | D10e | 0.00000E+00 | 0.00000E+00 |
| OTHERS | | | | | Suffics s INDICATE LASER SIDE | | | | |
| FOCAL LENGTH OF TORIC LENS IN MAIN SCANNING DIRECTION | fm | 149.67 | | | Suffics e INDICATE SIDE OPPOSITE TO LASER | | | | |
| POLYGON SURFACE-SURFACE TO BE SCANNED | L | 216.63 | | | | | | | |
| L/fm | a | 1.45 | | | | | POWER RATIO IN SUB SCANNING DIRECTION | | |
| INTERVAL OF PRINCIPAL PLANES | HH' | 11.88 | | | | | φs2/φs | | 0.929 |
| (L-HH')/fm | b | 1.37 | | | | | | | |

SCANNING OPTICAL APPARATUS AND IMAGE FORMING APPARATUS USING THE SAME

BACKGROUND OF THE INVENTION

1. Field of the Invention

The present invention relates to a scanning optical apparatus and an image forming apparatus using the scanning optical apparatus. More particularly, the present invention relates to a scanning optical apparatus that is suitably used for an apparatus, such as a laser beam printer or a digital copying machine having an electrophotographic process, in which an optically modulated light flux emitted from a light source means is reflected and deflected by a polygon mirror functioning as an optical deflection means and then optically scans a surface to be scanned through an scanning optical system, thereby recording image information. In particular, the present invention relates to a scanning optical apparatus with which there is always obtained a favorable image where the sensitivity of scanning line bending to rotational decentration of a single lens constituting a scanning optical system is reduced. The present invention also relates to an image forming apparatus using the scanning optical apparatus.

Also, the present invention relates to a color image forming apparatus that uses a plurality of scanning optical apparatuses and is constructed from a plurality of image bearing members corresponding to respective colors.

2. Related Background Art

In a conventional scanning optical apparatus applied to a laser beam printer (LBP) or the like, a light flux optically modulated in accordance with an image signal and emitted from a light source means is periodically deflected by a light deflector composed of a rotary polygon mirror (polygon mirror) or the like. The deflected light flux is converged to form a spot on a surface of a photosensitive recording medium (photosensitive drum) by an imaging scanning optical system having an fθ characteristic and optically scans the surface, thereby performing image recording.

FIG. 20 is a schematic diagram showing the main part of a conventional scanning optical apparatus.

In this drawing, a diverging light flux emitted from a light source means 171 is converted into a nearly parallel light flux by a collimator lens 172, an aperture stop 173 limits the light flux, and the limited light flux strikes a cylindrical lens 174 having a predetermined refractive power only in the sub scanning direction. The nearly parallel light flux striking the cylindrical lens 174 is emitted as it is in a main scanning cross-section. Also, in a sub scanning cross-section, the light flux is converged and imaged as a nearly linear image on a deflecting surface (a reflecting surface) 175a of a light deflector (a deflection means) 175 composed of a polygon mirror.

Then, the light flux deflected by the deflecting surface 175a of the light deflector (the deflection means) 175 is guided by an imaging scanning optical system 76 having an fθ characteristic onto a photosensitive drum surface 178 that is a surface to be scanned. By having the light deflector (the deflection means) 175 rotate in the direction of arrow A, the photosensitive drum surface 178 is optically scanned in the direction of arrow B, thereby performing the recording of image information.

In order to perform the recording of image information with high precision in a scanning optical apparatus like this, it is required that the following requirements are met. For instance, the curvature of field is favorably corrected across the entire of the surface to be scanned. Also, there exists a distortion characteristic (fθ characteristic) having a uniform speed property between an angle of view θ and an image height Y. Further, the spot diameter on an image surface remains uniform irrespective of differences in image height. There have conventionally been proposed various kinds of scanning optical apparatuses or imaging scanning optical systems that satisfy optical characteristics like these.

On the other hand, as the sizes and prices of apparatuses, such as laser beam printers and digital copying machines, are reduced, the same demand is made to scanning optical apparatuses.

As a construction satisfying the demand like this, JP 04-50908 A and JP 09-33850 A, for instance, propose a scanning optical apparatus whose imaging scanning optical system is constructed from a single fθ lens.

In JP 04-50908 A, an aberration characteristic is relatively favorably corrected by using an aspheric surface of a high order in the main scanning direction of an fθ lens. However, the magnification between a deflection means and a surface to be scanned in the sub scanning direction does not remain constant, so that there is a tendency for a spot diameter in the sub scanning direction to change in accordance with the differences in image height.

On the other hand, in JP 09-33850 A, there is proposed a method described below. In a scanning optical apparatus, on at least two surfaces of lens surfaces of an fθ lens, the curvature in the sub scanning direction continuously changes along the main scanning direction within an effective region of the fθ lens as well as independently of the curvature in the main scanning direction. With this method, the position of the principal plane in the sub scanning direction is controlled by the bending of two surfaces. In this manner, the sub scanning magnification is kept constant irrespective of the differences in image height, so that there is obtained a constant spot diameter.

With the proposed method described above, in order to obtain a constant sub scanning magnification, at least two surfaces are bent and the position of the principal plane is controlled so that the magnification is kept constant. Consequently, it becomes possible to set shapes in the main scanning direction and the sub scanning direction completely independently of each other. However, because of various demands such as a demand to reduce the thickness of a lens, the lens shape in the main scanning direction has a relatively large amount of an aspheric surface in many cases.

In a lens like this whose amount of an aspheric surface in the main scanning direction is large, optical performance is significantly degraded due to errors caused during the arrangement of each lens surface and the lens. Among the degradations of optical performance, as distinct from the aberration of the height of a scanning line, the inclination of the scanning line, and the like, the bending of the scanning line in the sub scanning direction in particular causes a significant problem because it is impossible to correct this bending by the adjustment of a mirror or the like arranged in an apparatus main body. Consequently, in order to suppress the scanning line bending to a minute amount, it is required to precisely arrange each lens surface and the lens in accordance with design values or to adjust the positions of each lens surface and the lens so as to coincide with design positions by providing the lens with an adjustment mechanism.

Further, in the case of a color image forming apparatus in which scanning optical apparatuses are arranged using four photosensitive members (photosensitive drums), latent images are formed by laser light, and images on an original in respective colors of Y (yellow), M (magenta), C (cyan), and Bk (black) are formed on the surfaces of their corresponding photosensitive members, images in four colors of Y, M, C, and Bk formed on the surfaces of respective photosensitive members are superimposed on each other on a transfer member such as paper. Consequently, if the scanning lines of the scanning optical apparatuses corresponding to respective photosensitive members are bent, there occur differences in shape between scanning lines for the four colors, which causes a problem that color drift occurs in an image on the transfer member and therefore image performance is significantly degraded.

SUMMARY OF THE INVENTION

The present invention has been made to solve these problems and an object of the present invention is to provide a scanning optical apparatus that is capable of suppressing scanning line bending caused by rotational decenterity of a single lens to a minute amount and an image forming apparatus using the scanning optical apparatus. To do so, an fθ lens is constructed using a single lens and the shape of the fθ lens is appropriately set so that there are favorably corrected the field curvature characteristic that is a characteristic of an optical system, an fθ characteristic for performing uniform speed scanning, and wave front aberration.

According to a first aspect of the present invention, there is provided a scanning optical apparatus comprising: light source means; deflection means for deflecting a light flux emitted from the light source means; and a scanning optical system that images the deflected light flux as a spot on a surface to be scanned, in which the scanning optical system is a single lens, and a surface shape of the single lens is set so that a direction of scanning line bending in a sub scanning direction occurring when an incident surface of the single lens is rotationally decenter about an axis parallel to a main scanning direction is opposite to a direction of scanning line bending in the sub scanning direction occurring when an exit surface of the single lens is rotationally decenter about the axis parallel to the main scanning direction.

According to a second aspect of the present invention, in the optical scanning apparatus according to the first aspect of the invention, the scanning line bending in the sub scanning direction occurring when the incident surface of the single lens is rotationally decenter about the axis parallel to the main scanning direction cancels out the scanning line bending in the sub scanning direction occurring when the exit surface of the single lens is rotationally decenter about the axis parallel to the main scanning direction.

According to a third aspect of the present invention, in the optical scanning apparatus according to the first aspect of the invention, when power in the sub scanning direction of entirety of the scanning optical system is referred to as Φs and power in the sub scanning direction of the exit surface of the single lens is referred to as Φs2, the power in the sub scanning direction of the exit surface of the single lens satisfies a condition of 0.9 Φs2/Φs 1.1.

According to a fourth aspect of the present invention, in the first aspect of the invention, there is provided a scanning optical apparatus, in which power in the sub scanning direction of an exit surface of the single lens satisfies a condition of 0.95 Φs2/Φs 1.05.

According to a fifth aspect of the present invention, in the optical scanning apparatus according to the first aspect of the invention, when an air converted distance from the deflection means to the exit surface of the single lens on an optical axis is referred to as Lao, a distance from the exit surface of the single lens to the surface to be scanned is referred to as $L_{bo}$, an off-axis air converted distance from the deflection means to the exit surface of the single lens is referred to as $L_{aθ}$, and a distance from the exit surface of the single lens to the surface to be scanned is referred to as $L_{bθ}$, a shape of the exit surface of the single lens in the main scanning direction satisfies the following condition:

$$0.9 \times \frac{L_{bo}}{L_{ao}} \le \frac{L_{bθ}}{L_{aθ}} \le 1.1 \times \frac{L_{bo}}{L_{ao}}$$

According to a sixth aspect of the present invention, in the optical scanning apparatus according to the fourth aspect of the invention, a shape of the exit surface of the single lens in the main scanning direction satisfies the following condition.

According to a seventh aspect of the present invention, in the scanning optical apparatus according to the first aspect of the invention, a light flux forming a linear image that is long in the main scanning direction is incident on the deflection means.

According to an eighth aspect of the present invention, in the scanning optical apparatus according to the first aspect of the invention, the single lens is formed by a molding process.

According to a ninth aspect of the present invention, in the optical scanning apparatus according to the first aspect of the invention, at least one of power of the exit surface in the sub scanning direction and power of the incident surface in the sub scanning direction varies without any correlation with a shape in the main scanning direction.

According to a tenth aspect of the present invention, in the optical scanning apparatus according to the first aspect of the invention, a radius of curvature of the exit surface in the sub scanning direction varies from on the axis toward off the axis.

According to an eleventh aspect of the present invention, in the optical scanning apparatus according to the first aspect of the invention, each of the incident surface and the exit surface is an anamorphotic surface.

According to a twelfth aspect of the present invention, in the optical scanning apparatus according to the first aspect of the invention, a shape of the exit surface of the single lens is circular arc.

According to a thirteenth aspect of the present invention, in the optical scanning apparatus according to the first aspect of the invention, a shape of the exit surface of the single lens is non-circular arc.

According to a fourteenth aspect of the present invention, in the optical scanning apparatus according to the first aspect of the invention, a difference between imaging magnifications in the sub scanning direction of the scanning optical system within an image effective area is 10% or less.

According to a fifteenth aspect of the present invention, in the scanning optical apparatus according to the twelfth aspect of the invention, a shape of the exit surface of the single lens in the main scanning direction is a nearly circular arc shape having a center of curvature on the deflection means side.

According to a sixteenth aspect of the present invention, in the scanning optical apparatus according to the first aspect of the invention, the single lens satisfies the following equations:

$$|\Delta Z_l| = |\Delta Z_{1d} + \Delta Z_{1L} + \Delta Z_{1\phi} + \Delta Z_2| \le 0.040$$

$$\Delta Z_2 = \Delta X_2 \times \frac{L_{2o}}{fs_{2o}} \times \gamma$$

$$\Delta Z_{1d} = \frac{N-1}{N} \times \frac{1}{\cos^2\phi} \times \left(1 - \frac{L_{2o}}{fs_{2o}}\right) \times \gamma \times (d_\theta - d_o)$$

$$\Delta Z_{1L} = (N-1) \times \frac{1}{\cos^2\phi} \times \gamma \times (L_{2\theta} - L_{2o})$$

$$\Delta Z_{1\phi} = (N-1) \times L_{2o} \times \gamma \times \tan^2\phi$$

where $\Delta X_2$ is a deviation of an exit surface 6b of the lens,
 $Rx_o$ is a distance from the exit surface of the lens to a center of sagittal curvature on an optical axis along a direction of the optical axis,
 $Rx_\theta$ is a distance from the exit surface of the lens to the center of sagittal curvature at an angle of view θ along the direction of the optical axis,
 $L_{2o}$ is a distance from the exit surface of the lens to the surface to be scanned on the optical axis,
 $L_{2\theta}$ is a distance from the exit surface of the lens to the surface to be scanned at an angle of view 74,
 $fs_{2o}$ is a focal length of the exit surface of the lens in the sub scanning direction on the optical axis,
 $fs_{2o}$ is a focal length of the exit surface of the lens in the sub scanning direction at the angle of view θ,
 N is a refractive index of the lens,
 $d_o$ is a distance between the incident surface and the exit surface of the lens on the optical axis,
 $d_\theta$ is a distance between an incident surface 6a and the exit surface of a lens 6 at the angle of view θ,
 $fs_{2o}$ is a focal length of the exit surface of the lens in the sub scanning direction on the optical axis,
 $fs_{2\theta}$ is a focal length of the exit surface of the lens in the sub scanning direction at the angle of view θ,
 $L_{2o}$ is a distance from the exit surface of the lens to the surface to be scanned on the optical axis,
 $L_{2\theta}$ is a distance from the exit surface of the lens to the surface to be scanned at the angle of view θ, and
 Φ is an inclination of a ray of light after emission from the incident surface in the main scanning direction at the angle of view θ.

According to a seventeenth aspect of the present invention, in the scanning optical apparatus according to the first aspect of the invention, the light source means is a multi-beam light source having a plurality of light-emitting points that can be modulated independently of each other.

According to an eighteenth aspect of the present invention, there is provided an image forming apparatus comprising: a scanning optical apparatus according to any one of the first to seventeenth aspects of the invention; a photosensitive member arranged on the surface to be scanned; a developing device that develops an electrostatic latent image formed on the photosensitive member by a light flux scanned by the scanning optical apparatus as a toner image; a transferring device that transfers the developed toner image onto a material to be transferred; and a fixing device that fixes the transferred toner image on the material to be transferred.

According to a nineteenth aspect of the present invention, there is provided an image forming apparatus comprising: a scanning optical apparatus according to any one of the first to seventeenth aspects of the invention; and a printer controller that converts code data inputted from an external device into an image signal and inputs the image signal into the scanning optical apparatus.

According to a twentieth aspect of the present invention, there is provided an image forming apparatus comprising: a plurality of scanning optical apparatuses that are each a scanning optical apparatus according to any one of the first to seventeenth aspects of the invention; and a plurality of image bearing members that are arranged on surfaces to be scanned of respective scanning optical apparatuses and form images in colors differing from each other.

BRIEF DESCRIPTION OF THE DRAWINGS

FIG. 3 shows design data in the first embodiment of the present invention;

FIG. 9 shows design data in the second embodiment of the present invention;

FIG. 14 shows design data in the third embodiment of the present invention;

DESCRIPTION OF THE PREFERRED EMBODIMENTS

First Embodiment

Figure 1A:
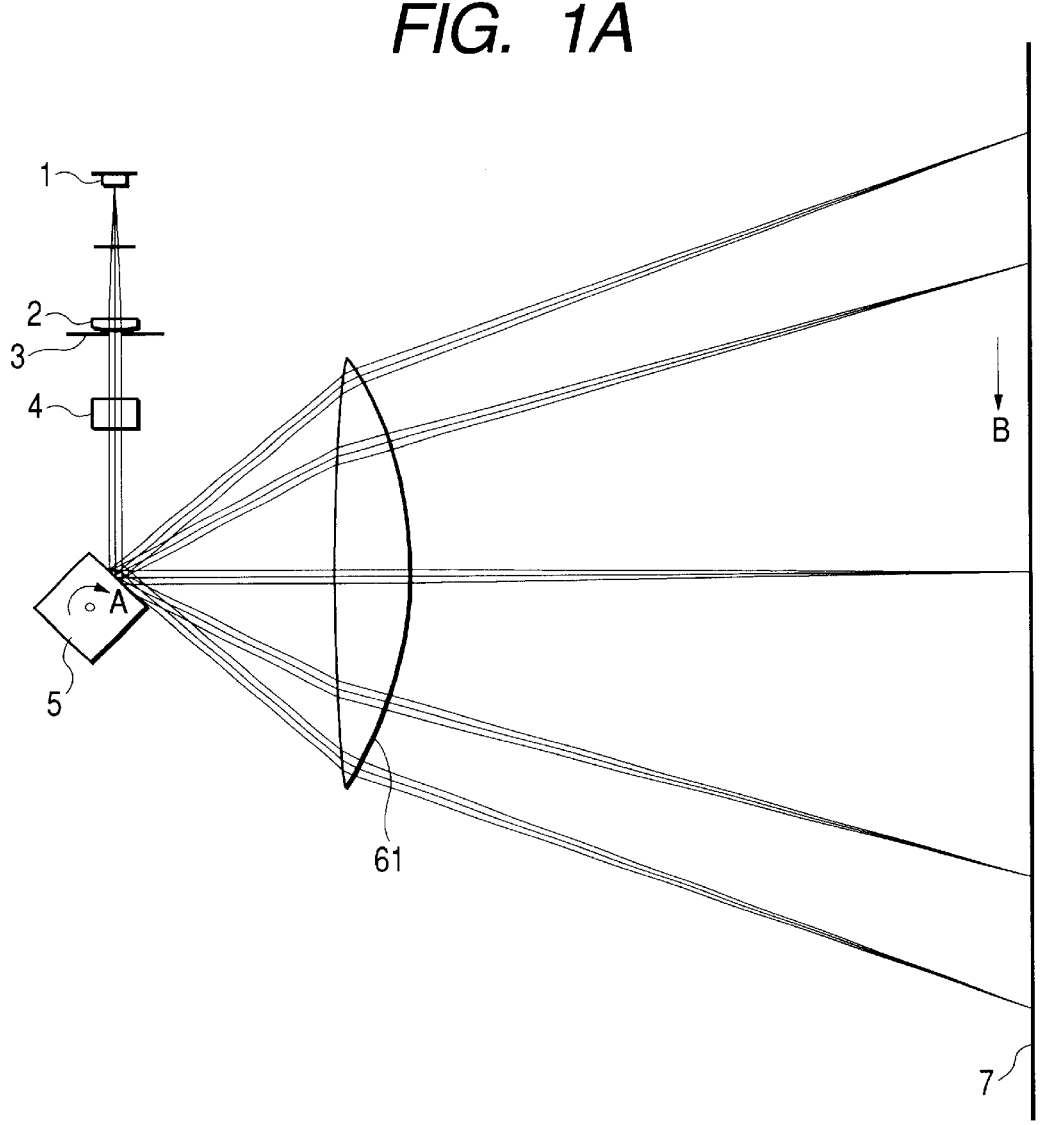
FIGS. 1A and 1B are a main scanning cross-sectional view and a sub scanning cross-sectional view in a first embodiment of the present invention.
Figure 1B:
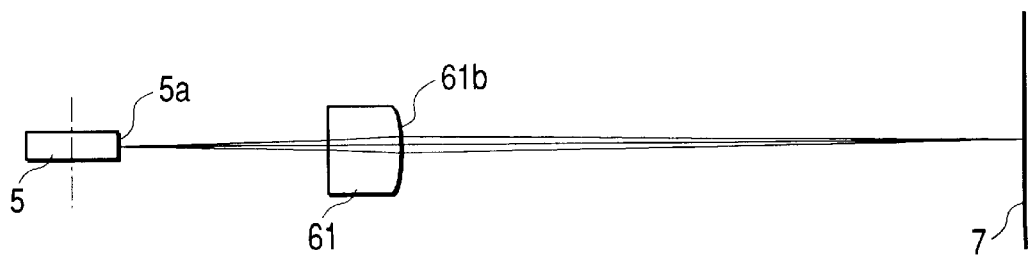

FIG. 1A is a main scanning cross-sectional view of a scanning optical apparatus in a first embodiment of the present invention, while FIG. 1B is a sub scanning cross-sectional view thereof.

Here, the main scanning direction means a direction in which a light flux is scanned by optical scanning, while the sub scanning direction means a direction orthogonal to an optical axis and the main scanning direction.

Diverging light from a semiconductor laser 1 that is a light source means is converted into a nearly parallel light flux by a single collimator lens 2 constituting a first optical system. Following this, the width of the light flux is limited by an aperture stop 3 to obtain a desired spot diameter.

A second optical system is constructed from a single cylindrical lens 4 having a predetermined refractive power only in the sub scanning direction. The light flux is imaged as a linear image, which is long in the main scanning direction, in the vicinity of a deflecting surface 5a of a deflection means 5 to be described later.

Reference numeral 5 denotes the deflection means that is constructed, for instance, from a polygon mirror (rotary polygon mirror) having a four-surface construction. This deflection means is rotated at a constant speed in the direction of arrow A in the drawing by a driving means (not shown) like a motor.

Reference numeral 61 represents a third optical system (scanning optical system) having an fθ characteristic. This third optical system allows a light flux reflected and deflected by the deflection means 5 to be imaged on a photosensitive member drum surface 7 functioning as a surface to be scanned. The third optical system also corrects the surface inclination of the deflecting surface 5a of the deflection means 5. During this correction, two light fluxes reflected and deflected by the deflecting surface 5a of the deflection means are guided onto the photosensitive member drum surface 7 through the third optical system 61 and simultaneously optical scanning is performed on the photosensitive member drum surface 7 in the direction of arrow B by having the polygon mirror 5 rotate in the direction of arrow A. By doing so, a scanning line is formed on the photosensitive member drum surface and image recording is performed.

Here, there will be described a single fθ lens constituting the third optical system (imaging scanning optical system) 61.

The fθ lens 61 is a plastic lens formed by a molding process from ZEONEX E48R (manufactured by ZEON Corporation) that is an optical resin. Only an exit surface 61b of this lens has power (refractive power) in the sub scanning direction. In addition, the shape in the main scanning direction (meridional shape) is a circular arc shape whose center of curvature exists on the polygon mirror 5 side and which allows the sub scanning magnification to be kept approximately constant.

Figure 2:
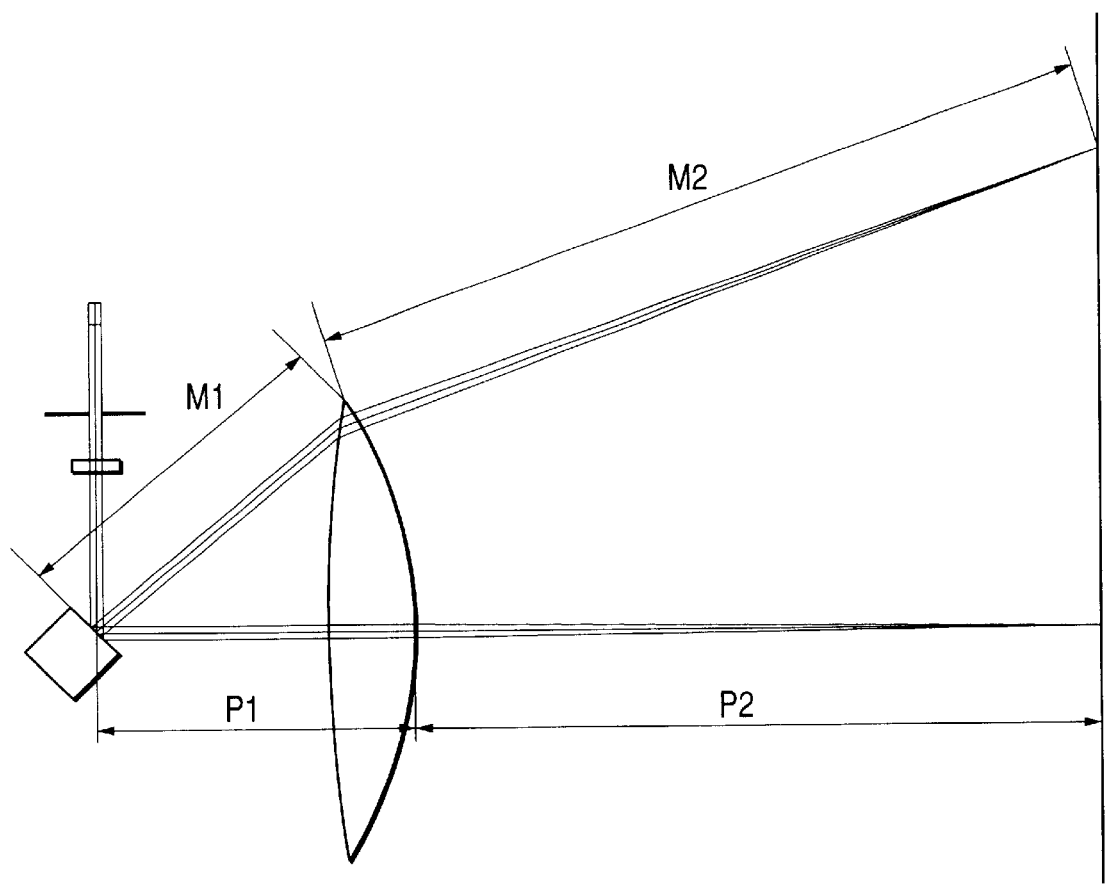
FIG. 2 is a schematic diagram showing the main part in the first embodiment of the present invention.

Here, as shown in FIG. 2, the main scanning direction shape (meridional shape), with which the sub-scanning magnification is kept constant, is a shape where the ratio between (1) an air converted distance (conversion for the inside of the lens is performed by dividing an actual distance by a refractive index) from the deflecting surface 5a of the polygon mirror 5 to the exit surface 61b of the scanning lens 61 and (2) a distance from the exit surface 61b to the surface to be scanned 7 is kept approximately constant within an image effective area. As a result, the main scanning direction shape becomes a nearly circular arc shape whose center of curvature exists on the polygon mirror 5 side. The ratio is expressed as follows:

$$\left(\frac{M2}{M1} \simeq \frac{P2}{P1}\right)$$

Also, there is obtained a shape where only the exit surface 61b has power in the sub scanning direction and the radius of curvature gradually increases from an optical axis toward off the axis. With this shape, there are corrected the curvature of field in the sub scanning direction and the uniformity of the sub scanning magnification (constant sub scanning magnification).

In the main scanning direction, the shape of the exit surface 61b is a circular arc shape, with which there is obtained a constant sub scanning magnification, and the incident plane 61a has a non-circular arc shape with which there are corrected the remaining curvature of field in the main scanning direction and an fθ characteristic.

FIG. 3 shows design data in this embodiment.

The surface shape of the refracting surface of the present invention is expressed by the following shape expressing equation.

When the intersection point with the optical axis is set as an origin, the optical axis direction is set as an X axis, an axis orthogonal to the optical axis within the main scanning plane is set as a Y axis, and an axis orthogonal to the optical axis within the sub scanning plane is set as a Z axis, the meridional direction corresponding to the main scanning direction is obtained from the following equation.

$$X = \frac{Y^2/R}{1+\sqrt{1-(1+k)(Y/R)^2}} + B_4 Y^4 + B_6 Y^6 + B_8 Y^8 + B_{10} Y^{10}$$

(where R is the radius of curvature and k, $B_4$, $B_6$, $B_8$, and $B_{10}$ are each an aspheric surface coefficient)

Also, the sagittal direction corresponding to the sub scanning direction (direction including the optical axis and orthogonal to the main scanning direction) is obtained from the following equation.

$$S = \frac{Z^2/r'}{1+\sqrt{1-(Z/r')^2}}$$

$$r' = r_0(1 + D_2 Y^2 + D_4 Y^4 + D_6 Y^6 + D_8 Y^8 + D_{10} Y^{10})$$

(where r' is the radius of curvature of the sagittal line on the optical axis and $D_2$, $D_4$, $D_6$, $D_8$, and $D_{10}$ are each a coefficient)

It should be noted here that the radius of curvature of the sagittal line r' off the optical axis is defined within a plane including the normal of the meridional line at each position and perpendicular to the main scanning surface. Also, the polynomial expression in the shape expressing equation is expressed using a function of up to the 10th order, although there occurs no problem even if the order is higher or lower than this.

Figure 4A:
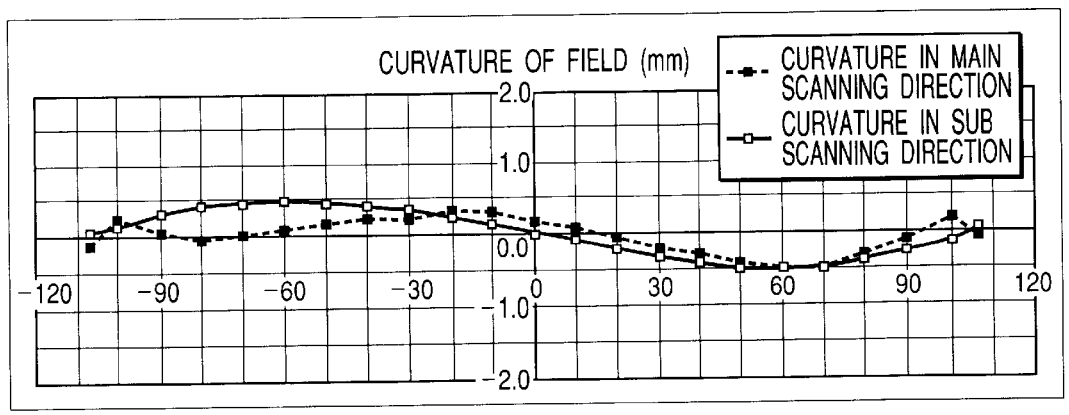
FIGS. 4A, 4B, and 4C are aberration diagrams in the first embodiment of the present invention.
Figure 4B:
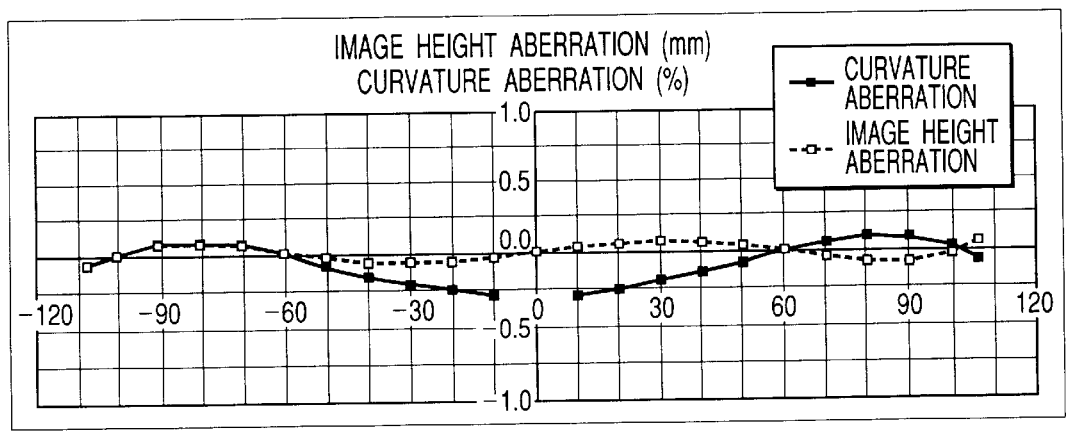
Figure 4C:
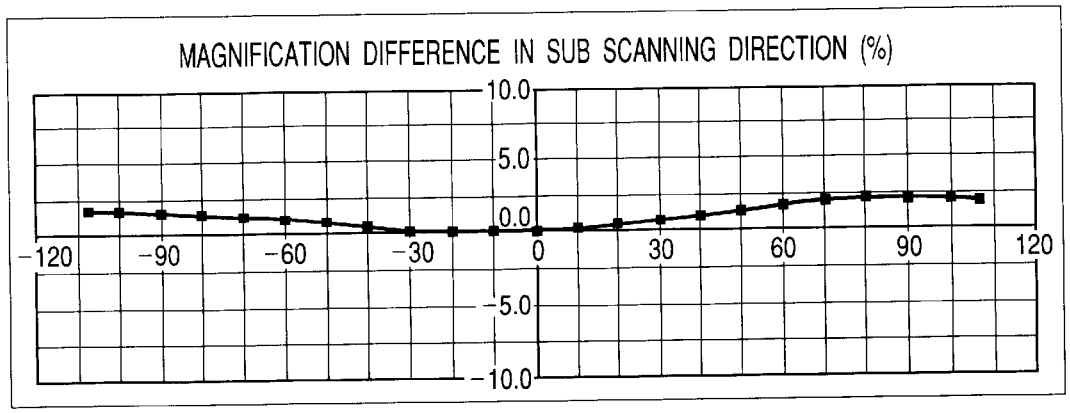

Also, FIGS. 4A to 4C are aberration diagrams of the scanning optical apparatus in this embodiment.

As can be seen from these drawings, the curvatures of field in both of the main scanning direction and the sub scanning direction are at or below ±0.5 mm and the uniformity of the sub-scanning magnification is at or below 2.5%, which means that correction is favorably performed. It is required that from the viewpoint of practical use as a scanning optical apparatus, the magnification difference in the sub scanning direction within an image effective area is suppressed to 10% or lower, or preferably to 5% or lower.

When doing so, with the construction where a constant sub scanning magnification within an image effective area is obtained like the single fθ lens 61 of this embodiment, in the case where the whole of the scanning lens 6 is decenter in the sub scanning direction (Z direction) due to errors caused during the attachment of the lens to an optical box (case) and errors caused during the manufacturing of the lens itself, a scanning line is shifted in its entirety, which makes it possible to avoid the bending of the scanning line.

Also, the single fθ lens 61 of this embodiment has a construction where the incident surface 61a has no power in the sub scanning direction and only the exit surface 61b has power, so that the sub scanning magnification is kept constant across each of the incident surface 61a and the exit surface 61b of the single fθ lens 61.

With this construction, in particular, even in the case where there occurs decentration of the exit surface 61b with reference to the incident surface 61a in the sub scanning direction due to the insufficient attachment accuracy within a mold used for a molded lens, the scanning line is shifted in its entirety, which makes it possible to avoid the bending of the scanning line.

Following this, there will be described the bending of a scanning line in the case where rotational decentration occurs to the incident surface 61a and the exit surface 61b of the single fθ lens 61 about an axis parallel to the main scanning direction.

In the case where the exit surface 61b is rotationally decenter by an angle of rotation γ about the axis parallel to the main scanning direction, when the height of a ray of light on an optical axis reaching the surface to be scanned is referred to as $Z_{2o}$ and the height of a ray of light with an angle of view θ reaching the surface to be scanned 7 is referred to as $Z_{2\theta}$, it is possible to calculate the bending amount $\Delta Z_2$ of the scanning line from the following equations.

$$\Delta Z_2 = Z_{2\theta} - Z_{2o} \qquad (1)$$

$$Z_{2o} = Rx_o \times \frac{L_{2o}}{fs_{2o}} \times \gamma \qquad (2)$$

$$Z_{2\theta} = (\Delta X_2 + Rx_\theta) \times \frac{L_{2\theta}}{fs_{2\theta}} \times \gamma \qquad (3)$$

where $\Delta X_2$ is a deviation of the lens exit surface 6b, $Rx_o$ is a distance from the exit surface 6b of the lens to a center of sagittal curvature on an optical axis along a direction of the optical axis, $Rx_\theta$ is a distance from the exit surface 6b of the lens to the center of sagittal curvature at an angle of view θ along the direction of the optical axis, $L_{2o}$ is a distance from the exit surface 6b of the lens to the surface to be scanned on the optical axis, $L_{2\theta}$ is a distance from the exit surface 6b of the lens to the surface to be scanned at an angle of view θ, $fs_{2o}$ is a focal length of the exit surface 6b of the lens in the sub scanning direction on the optical axis, $fs_{2\theta}$ is a focal length of the exit surface 6b of the lens in the sub scanning direction at the angle of view θ, Here, the deviation means a sag amount in the optical axis direction with reference to a lens surface position on the optical axis at the lens surface position. Also, in this embodiment, the sagittal line is formed in a direction perpendicular to the meridional line, so that $Rx_\theta$ is calculated from the following equation by applying an angle of inclination η of the meridional line to the radius of curvature $Rs_\theta$ of the sagittal line at an exit surface position of the lens.

$$Rx_\theta = Rs\theta \times \cos\eta \qquad (4)$$

Also, in the case where the incident surface 61a is rotationally decenter by an angle of rotation γ about the axis parallel to the main scanning direction, when the height of a ray of light on an optical axis reaching the surface to be scanned is referred to as $Z_{1o}$ and the height of a ray of light with an angle of view θ reaching the surface to be scanned 7 is referred to as $Z_{1\theta}$, it is possible to calculate the bending amount $\Delta Z_1$ of the scanning line from the following equations.

$$\Delta Z_1 = Z_{1\theta} - Z_{1o} \qquad (5)$$

$$Z_{1o} = \frac{N-1}{N} \times d_o \times \left\{ \left( \frac{N}{d_o} - \frac{1}{fs_{2o}} \right) \times L_{2o} + 1 \right\} \times \gamma \qquad (6)$$

$$Z_{1\theta} = \frac{N-1}{N} \times d_\theta \times \left\{ \left( \frac{N}{d_\theta} - \frac{1}{fs_{2\theta}} \right) \times L_{2\theta} + 1 \right\} \times \frac{1}{\cos^2\phi} \times \gamma \qquad (7)$$

where N is a refractive index of the scanning lens 61, $d_o$ is a distance between the incident surface 61a and the exit surface 61b of the fθ lens 61 on the optical axis, $d_\theta$ is a distance between the incident surface 61a and the exit surface 61b of the fθ lens 61 at the angle of view θ, $fs_{2o}$ is a focal length of the exit surface 61b of the lens in the sub scanning direction on the optical axis, $fs_{2\theta}$ is a focal length of the exit surface 61b of the lens in the sub scanning direction at the angle of view θ, $L_{2o}$ is a distance from the exit surface 61b of the lens to the surface to be scanned 7 on the optical axis, $L_{2\theta}$ is a distance from the exit surface 61b of the lens to the surface to be scanned 7 at the angle of view θ, and Φ is an inclination of a ray of light after emission from the incident surface 61a in the main scanning direction at the angle of view θ.

It is possible to obtain the amount of the scanning line bending $\Delta Z_1$ in the case where the single fθ lens 61 is rotationally decenter about the axis parallel to the main scanning direction as the sum of the amount of the scanning line bending occurring on the incident surface 61a and the amount of the scanning line bending occurring on the exit surface 61b.

$$\Delta Z_1 = \Delta Z_1 + \Delta Z_2 \qquad (8)$$

Here, there will be described a method of approximately obtaining the scanning line bending amount.

In this embodiment, the power in the sub scanning direction is concentrated on the exit surface 61b and the sub scanning magnification is kept constant, so that a ratio L2/fs2 between a distance L from the exit surface 61b to the surface to be scanned and a focal length fs2 of the exit surface 61b in the sub scanning direction assumes a constant value irrespective of the angle of view θ. As a result, a value of L2o/fs2o on the optical axis is applied to all angles of view as a representative.

Also, there exists the following relation.

$$\Delta X_2 >> Rx_2 - Rx_o \qquad (9)$$

As a result, it becomes possible to delete the component of Rx (distance from the exit surface 61b of the lens to the center of curvature of the sagittal line along the optical axis direction).

Consequently, the sole parameter varying between on the optical axis and the angle of view θ (factor causing the scanning line bending) is $\Delta X_2$. As a result, it becomes possible to calculate the scanning line bending amount $\Delta Z_2$ in the case where the exit surface 61b is rotationally decenter by the angle of rotation $\gamma$ about the axis parallel to the main scanning direction from a simple equation given below.

$$\Delta Z_2 = \Delta X_2 \times \frac{L_{2o}}{fs_{2o}} \times \gamma \quad (10)$$

Also, as to the scanning line bending amount $\Delta Z_1$ in the case where the incident surface 61a is rotationally decenter about the axis parallel to the main scanning direction, there exist three parameters varying between on the optical axis and the angle of view $\theta$ (factors causing the scanning line bending). The parameters are d (distance between the incident surface 61a and the exit surface 61b of the f$\theta$ lens 61), $L_2$ (distance from the lens exit surface 61b to the surface to be scanned 7), and $\Phi$ (inclination of a ray of light after the outgoing from the incident surface 61a in the main scanning direction).

In view of this situation, the amount of the scanning line bending to be caused is calculated for each parameter and the sum thereof is set as the scanning line bending amount occurring when the f$\theta$ lens is rotationally decenter about the axis parallel to the main scanning direction.

Also, each scanning line bending amount becomes as expressed by the following equations.

$$\Delta Z_1 = \Delta Z_{1d} + \Delta Z_{1L} + \Delta Z_{1\Phi} \quad (11)$$

$$\Delta Z_{1d} = \frac{N-1}{N} \times \frac{1}{\cos^2\phi} \times \left(1 - \frac{L_{2o}}{fs_{2o}}\right) \times \gamma \times (d_\theta - d_o) \quad (12)$$

$$\Delta Z_{1L} = (N-1) \times \frac{1}{\cos^2\phi} \times \gamma \times (L_{2\theta} - L_{2o}) \quad (13)$$

$$\Delta Z_{1\phi} = (N-1) \times L_{2o} \times \gamma \times \tan^2\phi \quad (14)$$

In this case, it is preferable that the scanning line bending in the case where the f$\theta$ lens 61 is rotationally decenter by 8.727E-4rad ($\gamma$=8.727E-4rad) about the axis parallel to the main scanning direction is 40 $\mu$m, or preferably 20 $\mu$m or below.

Consequently, as can be seen from Equation (8), it is enough that the shape of each surface of the single f$\theta$ lens 61 is constructed so that the following equation is satisfied.

$$|\Delta Z_1| = |\Delta Z_1 + \Delta Z_2| \leq 0.040$$

$$|\Delta Z_1| = |\Delta Z_1 + \Delta Z_2| \leq 0.020 \quad (15)$$

If the range of Equation (15) is exceeded, there occurs conspicuous image degradation due to scanning line bending. In particular, in a color image forming apparatus using a plurality of scanning optical apparatuses, color drift becomes a problem.

In the scanning optical apparatus of this embodiment, the scanning line bending amount $\Delta Z_1$ occurring in the case where $\theta$max=±40.9 (deg), $\Delta X_2$=−12.81 (mm), $L_{2o}$=147.28 (mm), $L_{2\theta}$=170.74 (mm), $fs_{2o}$=44.95 (mm), N=1.5242, $\Phi$=23.7 (deg), $d_o$=17.90 (mm), $d_\theta$=3.47 (mm), and the single f$\theta$ lens 61 is rotationally decenter by trisection ($\gamma$=0.0008727 rad) about the axis parallel to the main scanning direction becomes as follows from Equations (10) to (14) described above.

$\Delta Z_1$=+0.036 (mm)

$\Delta Z_2$=−0.037 (mm)

$\Delta Z_1$=−0.001 (mm)

From these, it can be found that the single f$\theta$ lens has a construction satisfying Equation (15) and the sensitivity of the scanning line bending to rotational decentration is reduced.

In the scanning optical apparatus in this embodiment, the air converted distance (actual distance/refractive index within the lens) from the deflecting surface 5a of the polygon mirror to the exit surface 61b of the scanning optical element 61 on the optical axis is $L_{ao}$=63.193 mm, a distance from the exit surface 61b of the scanning optical system 61 to the surface to be scanned 8 is $L_{bo}$=147.283 mm, the off-axis air converted distance from the deflecting surface 5a of the polygon mirror to the exit surface 61b of the scanning optical element 61 is $L_{a\theta}$=72.843 mm, the distance from the exit surface 61b of the scanning optical element 61 to the surface to be scanned 8 is $L_{b\theta}$=170.742 mm, and the following relation is obtained.

$$\frac{L_{b\theta}}{L_{a\theta}} = 1.0057 \times \frac{L_{bo}}{L_{ao}} \quad (a)$$

The main scanning direction shapes (meridional shapes) of both of the surfaces 61a and 61b (in particular, the exit surface 61b) are determined so as to satisfy the following condition.

$$0.9 \times \frac{L_{bo}}{L_{ao}} \leq \frac{L_{b\theta}}{L_{a\theta}} \leq 1.1 \times \frac{L_{bo}}{L_{ao}} \quad (b)$$

FIGS. 4A to 4C are each an aberration diagram showing paraxial aberration (the curvature of field, the curvature aberration, and the magnification difference in the sub scanning direction) of the optical scanning apparatus in this embodiment. The solid line indicates the curvature of field in the sub scanning direction and the dotted line indicates the curvature of field in the main scanning direction. As can be seen from these aberration diagrams, in this embodiment, the paraxial aberration is favorably corrected and there is realized a favorable optical scanning apparatus suited to high-definition printing.

The ratio of Fno in the sub scanning direction becomes as follows.

Fmin/Fmax=0.982≧0.9

This means that a certain condition concerning the sub scanning magnification is satisfied.

When the optical path length and focal length of the scanning optical system 61 are respectively referred to as L and f, the following relation is obtained.

1.35f≦L=1.45≦1.55f

This satisfies a relation between the optical path length and the focal length that determines the shape of the exit surface in the main scanning direction so that the sub scanning magnification is kept constant. The relation therebetween also favorably corrects the f$\theta$ characteristic and the curvature of field in the main scanning direction.

When power in the sub scanning direction of entirety of the scanning optical system is referred to as $\Phi$s and power in the sub scanning direction of the exit surface 61b (second surface) is referred to as Φs2, the following relation is obtained.

$$0.9 \leq \Phi s2/\Phi s \leq 1.1$$

Power in the sub scanning direction is concentrated on the exit surface, so that there is realized a system in which the sensitivity of the scanning line bending to arrangement becomes low.

Figure 5:
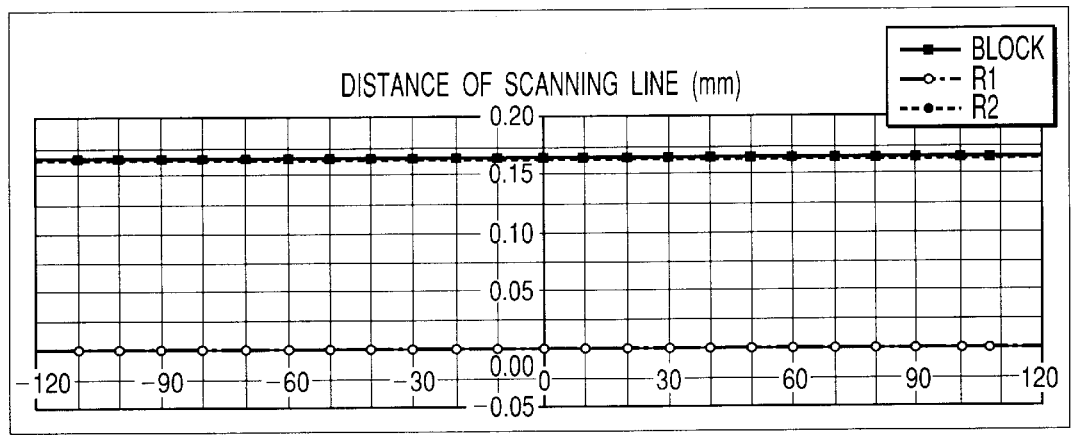
FIG. 5 shows the distance of a scanning line in the first embodiment of the present invention.

FIG. 5 shows the scanning line bending in the case where the incident surface 61a, the exit surface 61b, and the single fθ lens itself are shifted by 50 μm in the sub scanning direction (Z direction) in the scanning optical apparatus in this embodiment.

Figure 6:
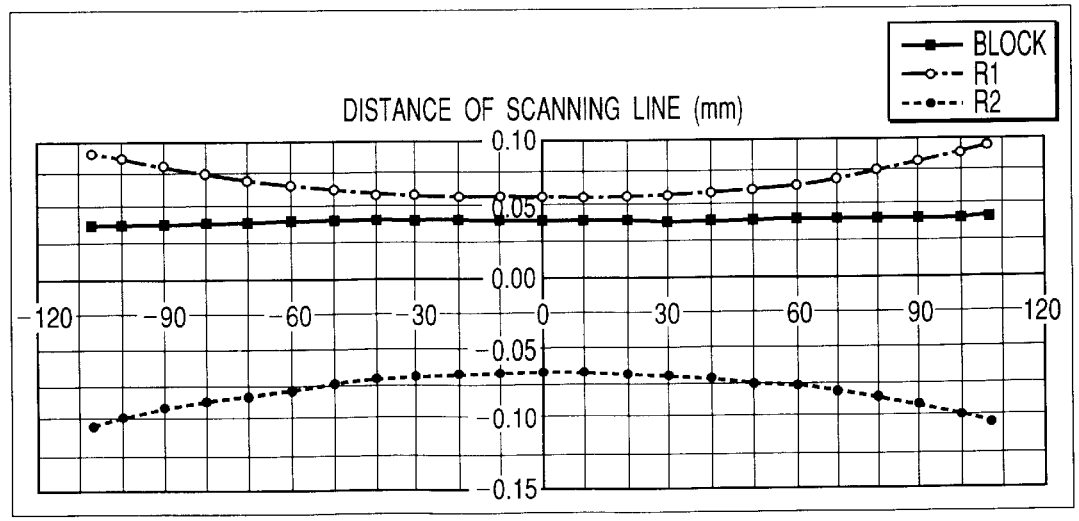
FIG. 6 also shows the distance of a scanning line in the first embodiment of the present invention.

Also, FIG. 6 shows the scanning line bending in the case where the incident surface 61a, the exit surface 61b, and the single fθ lens itself are rotationally decenter by trisection about the axis parallel to the main scanning direction in the scanning optical apparatus in this embodiment.

As to the decentration caused by the shift in the sub scanning direction, with the construction where the sub scanning magnification is uniformized across a lens and each surface has the identical sub scanning magnification, there is suppressed the sensitivity of the scanning line bending although the height reaching the surface to be scanned varies.

Also, as to the decentration caused by the rotation about the axis parallel to the main scanning direction, there is obtained a construction where Equations (10) to (15) described above are satisfied and the shape of the incident surface 61a is determined so that there occurs scanning line bending in a direction opposite to the scanning line bending caused by the rotational decentration of the exit surface 61b, with these scanning line bendings having the same bending amount. With this construction, the scanning line bending occurring on the incident surface 61a cancels out the scanning line bending occurring on the exit surface 6b, which reduces the sensitivity of the scanning line bending to a small level in the case where the single fθ lens itself is rotationally decenter.

As a result, by utilizing the effects of the present invention, it becomes possible to provide a scanning optical apparatus with which it is possible to always obtain a favorable image where the scanning line bending is suppressed to a small amount even if there occurs rotational decentration.

Also, in this embodiment, in order to compensate for focus movement with environmental change that is particularly conspicuous in the case of a plastic lens, at least one surface of the single fθ lens 61 may be formed by providing a diffraction grating surface.

Also, in this embodiment, even if the light source means is constructed from a multi-beam laser, it is possible to apply such a light source means in the same manner as in the first embodiment described above.

It does not matter whether the number of beams of the multi-beam is two or at least equal to three.

The single lens 61 that is a scanning optical element in this embodiment may be a glass lens formed by a molding process.

Second Embodiment

Figure 7A:
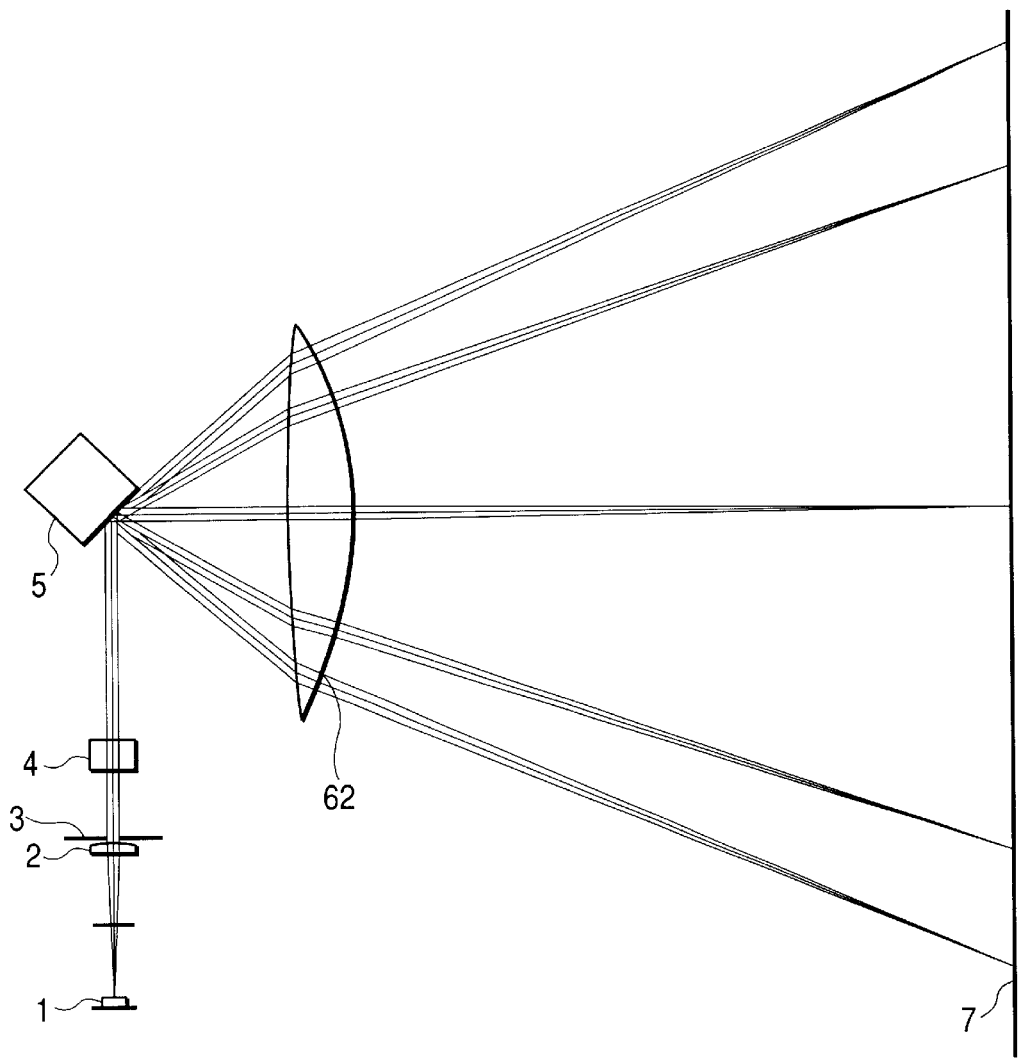
FIGS. 7A and 7B are a main scanning cross-sectional view and a sub scanning cross-sectional view in a second embodiment of the present invention.
Figure 7B:
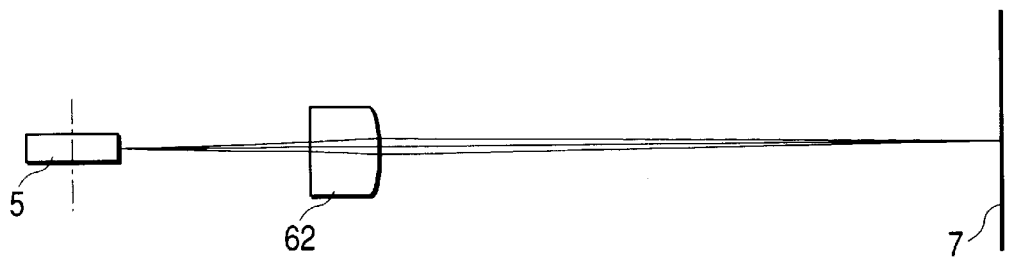

FIG. 7A is a main scanning cross-sectional view of a scanning optical apparatus in this embodiment, while FIG. 7B is a sub scanning cross-sectional view thereof.

The points of difference between this embodiment and the first embodiment are that multi-beam is used as the light source means and that the shapes of the incident surface and exit surface of the single fθ lens constituting the third optical system are changed. Other aspects are the same as those in the first embodiment.

In this drawing, reference numeral 11 denotes a multi-beam laser that is a light source means and simultaneously emits two light fluxes that have been modulated independently of each other (only one light flux is shown in the drawing).

Figure 8:
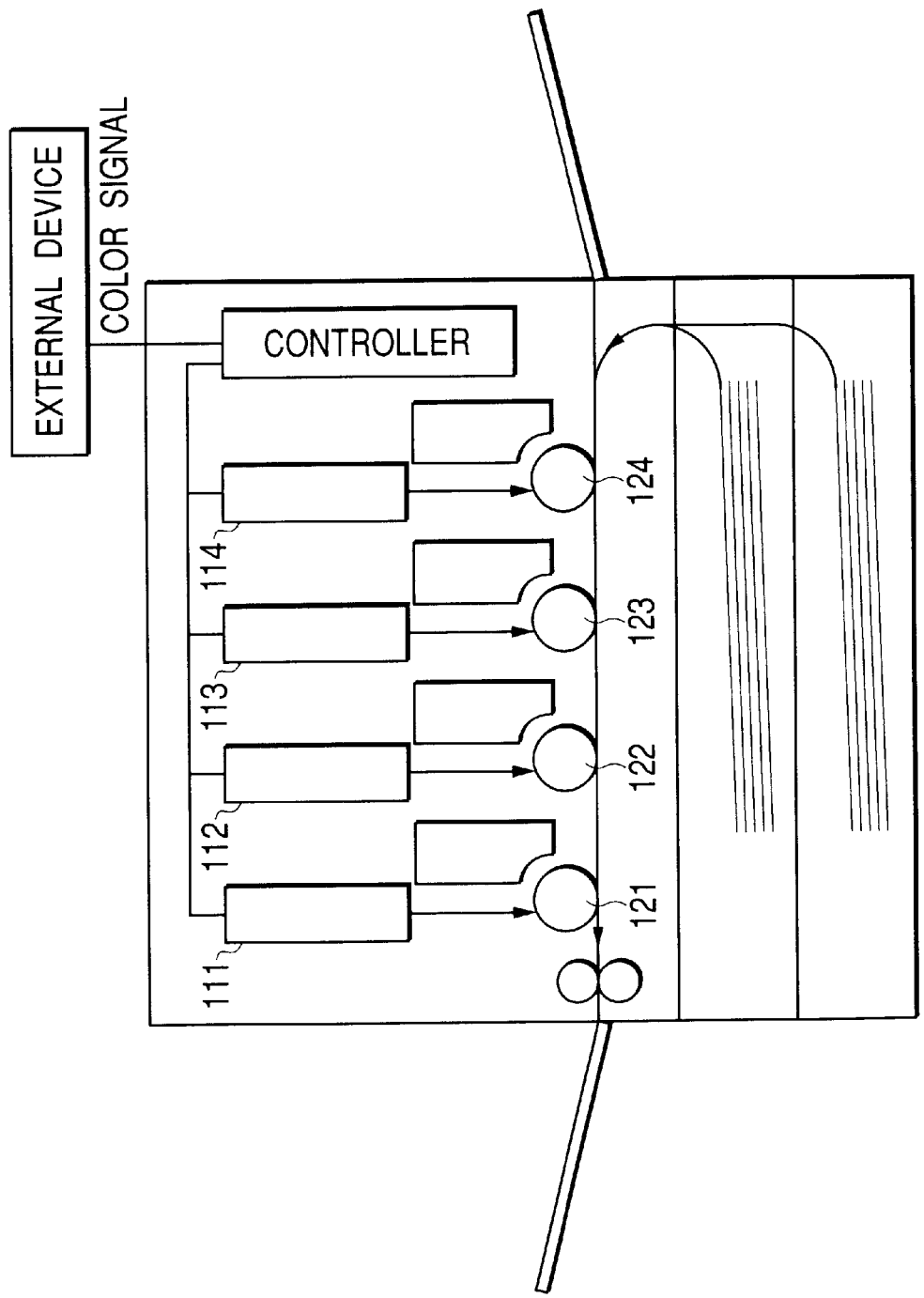
FIG. 8 is a schematic diagram showing the main part of a color image forming apparatus in the second embodiment of the present invention.

Also, in this embodiment, this scanning optical apparatus is placed in a color image forming apparatus shown in FIG. 8. This apparatus is a color image apparatus in which a plurality of light fluxes from a plurality of scanning optical apparatuses are guided onto their corresponding image bearing members and there is recorded image information of light in different colors.

FIG. 9 shows design data in this embodiment.

In this embodiment, the incident surface 61a of the single fθ lens 61 has an aspherical shape in the main scanning direction and has a convex toric surface in the sub scanning direction. The exit surface 61b is constructed from an aspherical shape in the main scanning direction and from a deformed toric surface in the sub scanning direction. This deformed toric surface has a circular arc shape having the radius of curvature that is different from that in the main scanning direction. Also, the radius of curvature of the deformed toric surface varies in response to the main scanning direction.

As to the exit surface 61b on which power in the sub scanning direction is concentrated, its shape in the main scanning direction is determined so that there is obtained a nearly constant sub scanning magnification within an image effective area.

When the shape is calculated using FIG. 9, there is obtained a relation of Φs2/Φs=0.932, which satisfies a condition of $0.9 \leq \Phi s2/\Phi s \leq 1.1$. There is also obtained a relation of Lbθ/Laθ=0.974×Lb0/La0, which satisfies the following condition.

$$0.9 \times \frac{L_{bo}}{L_{ao}} \leq \frac{L_{b\theta}}{L_{a\theta}} \leq 1.1 \times \frac{L_{bo}}{L_{ao}}.$$

Figure 10A:
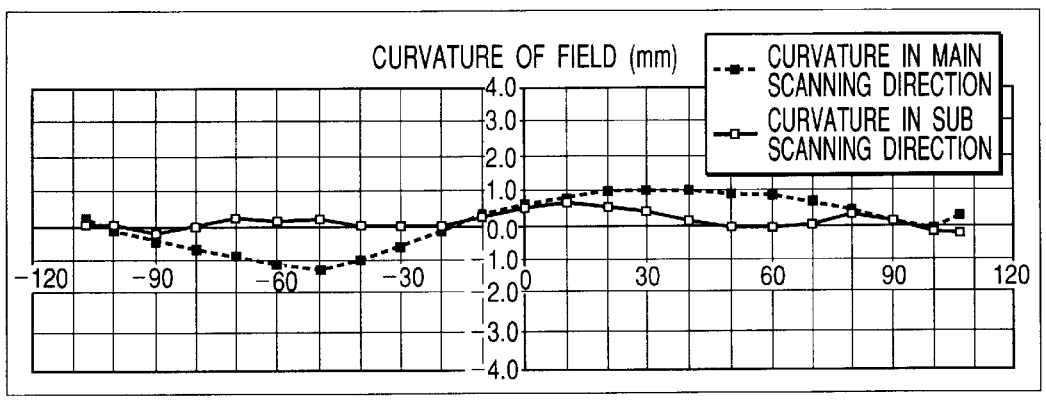
FIGS. 10A, 10B, and 10C are aberration diagrams in the second embodiment of the present invention.
Figure 10B:
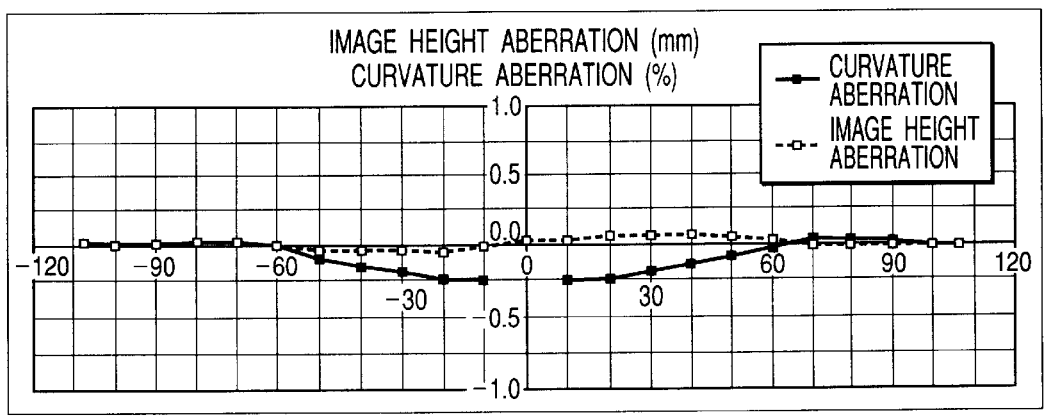
Figure 10C:
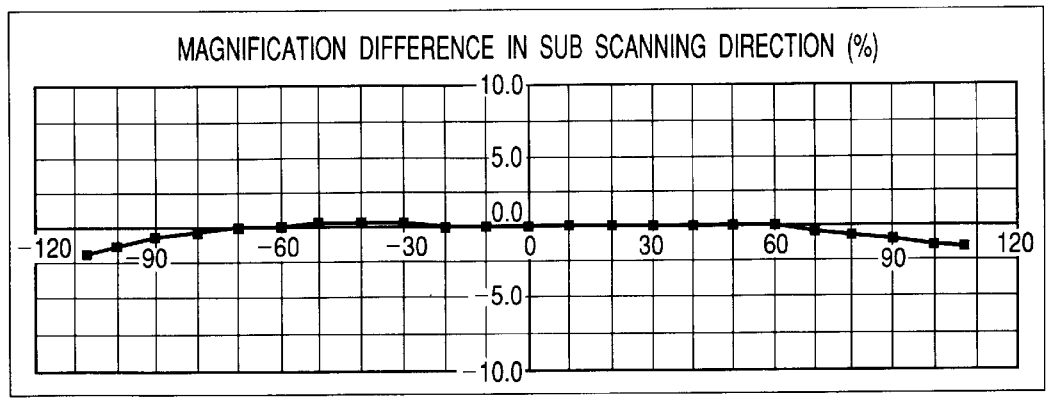

FIG. 10 shows the curvatures of field in the main scanning direction and the sub scanning direction, the fθ characteristic, and the sub scanning magnification of the single fθ lens of this embodiment, with each of these being favorably corrected.

Figure 11:
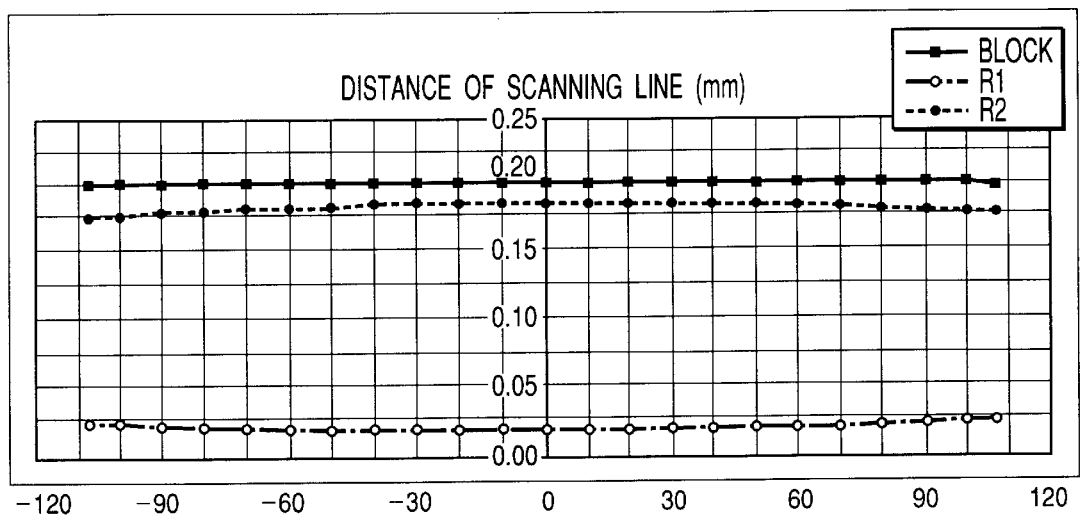
FIG. 11 shows the distance of a scanning line in the second embodiment of the present invention.

FIG. 11 is a drawing showing the distance of a scanning line in the sub scanning direction on a surface to be scanned in the case where the whole of a single fθ lens and each optical surface in this embodiment are decenter by 50 μm in the sub scanning direction. As can be seen from this drawing, although an irradiation position is displaced due to the decentration, the amount of scanning line bending caused is very small.

Figure 12:
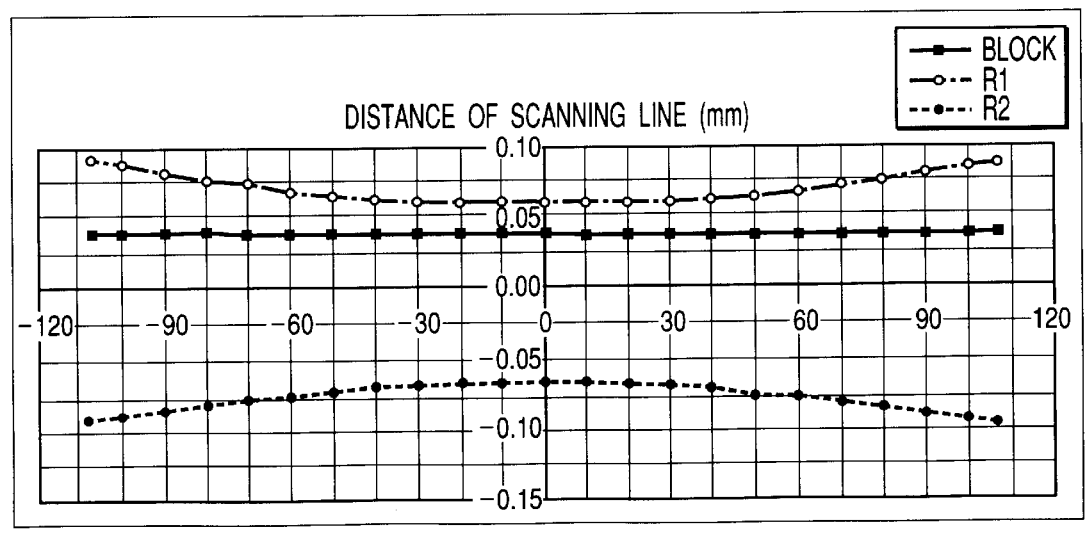
FIG. 12 also shows the distance of a scanning line in the second embodiment of the present invention.

Also, FIG. 12 is a drawing showing the distance of a scanning line in the sub scanning direction on a surface to be scanned in the case where the whole of the single fθ lens and each optical surface in this embodiment are rotationally decenter by trisection about an axis parallel to the main scanning direction. As can be seen from this drawing, although the irradiation position is displaced due to the decentration, the amount of scanning line bending caused is very small in a like manner.

As described above, in this embodiment, the third optical system is constructed from a single fθ lens constructed from a toric surface and a deformed toric surface. Also, there is formed an incident surface that satisfies the conditions expressed by Equations (10) to (15) and causes scanning line bending in a direction opposite to scanning line bending caused by the rotational decentration of an exit surface about the axis parallel to the main scanning direction, with these scanning line bendings having the same bending amount. With this construction, the scanning line bending occurring on the incident surface cancels out the scanning line bending occurring on the exit surface, which makes it possible to realize a scanning optical apparatus, which does not cause scanning line bending in the case where a single fθ lens is rotationally decenter, using the single fθ lens at low cost.

Further, as an effect unique to this embodiment, by uniformizing the sub scanning magnification of a single fθ lens within an image effective area, there is obtained uniform intervals between scanning lines of a plurality of light fluxes on a surface to be scanned in a scanning optical apparatus using multi-beam. As a result, it becomes possible to realize a scanning optical apparatus that is capable of performing high-definition image formation.

Also, there is formed an incident surface that satisfies the conditions expressed by Equations (10) to (15) and causes scanning line bending in a direction opposite to scanning line bending caused by the rotational decentration of an exit surface about the axis parallel to the main scanning direction, with these scanning line bendings having the same bending amount. With this construction, it becomes possible to realize a color image apparatus in which there occurs no scanning line bending due to errors caused during the attachment of the single fθ lens, it is not required to perform adjustment for scanning line bending, and color drift is reduced.

Third Embodiment

Figure 13A:
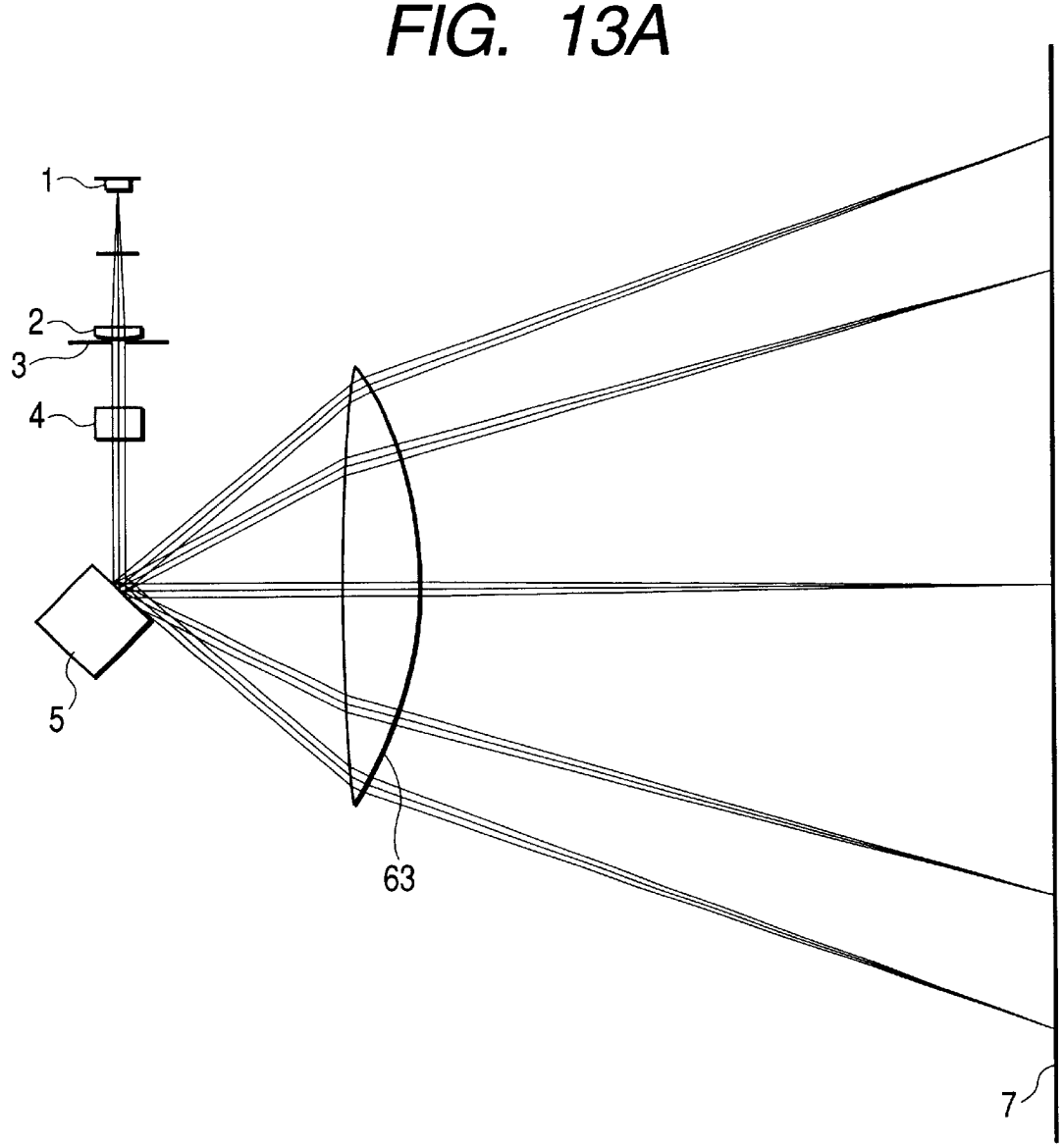
FIGS. 13A and 13B are a main scanning cross-sectional view and a sub scanning cross-sectional view in a third embodiment of the present invention.
Figure 13B:
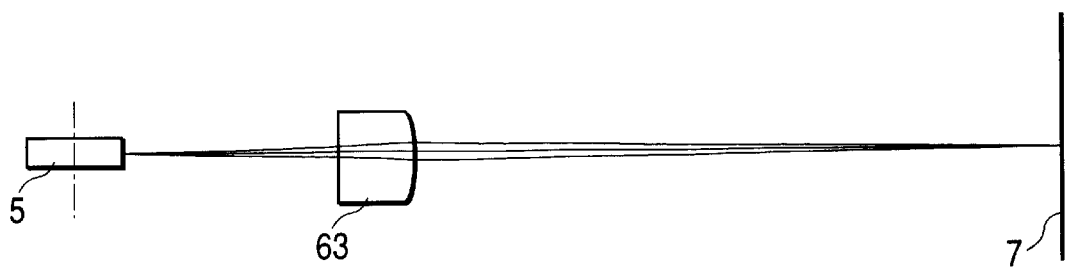

FIG. 13A is a cross-sectional view of a scanning optical apparatus in this embodiment in the main scanning direction, while FIG. 13B is a cross-sectional view thereof in the sub scanning direction. The point of difference between this embodiment and the first embodiment is that the shapes of the incident surface 61a and exit surface 61b of the single fθ lens 61 constituting the third optical system in the sub scanning direction are changed. Another point of difference is that the scanning optical apparatus is placed in an image forming apparatus. Other aspects are the same as those in the first embodiment.

FIG. 14 shows design data in this embodiment.

In this embodiment, the single fθ lens 61 has an aspherical shape in the main scanning direction and has a convex toric surface in the sub scanning direction. Its exit surface has a circular arc shape in the main scanning direction and is constructed from a deformed toric surface in the sub scanning direction that has a circular arc shape differing from the main scanning direction and has the radius of curvature varying in response to the main scanning direction. The shape of the exit surface in the main scanning direction is determined so that there is obtained a nearly constant sub scanning magnification in an image effective area. Also, the refracting power in the sub scanning direction is concentrated on the exit surface.

Figure 15A:
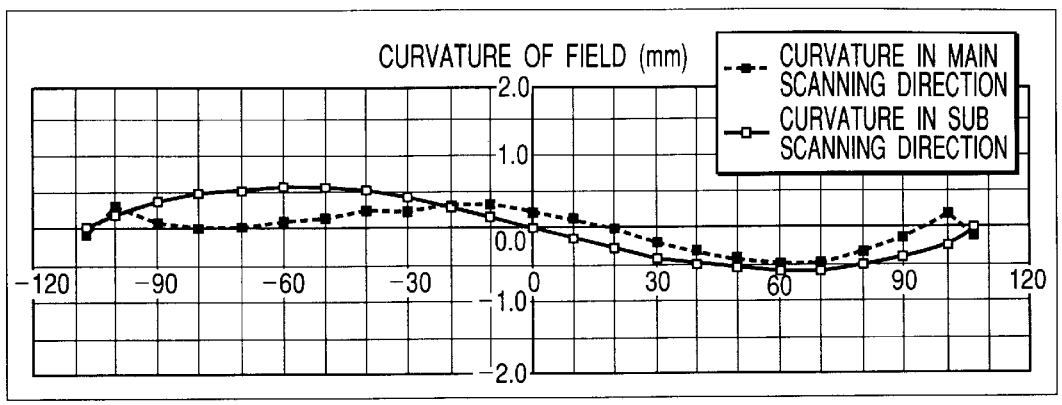
FIGS. 15A, 15B, and 15C are aberration diagrams in the third embodiment of the present invention.
Figure 15B:
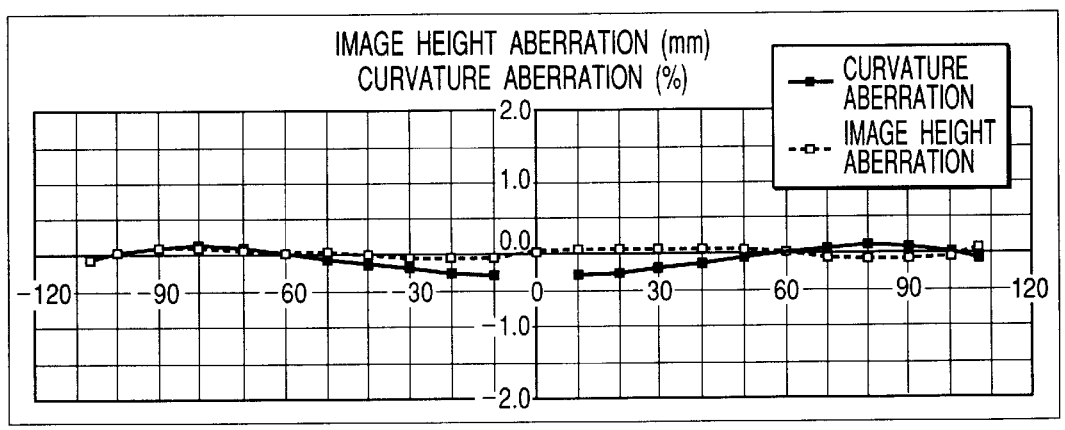
Figure 15C:
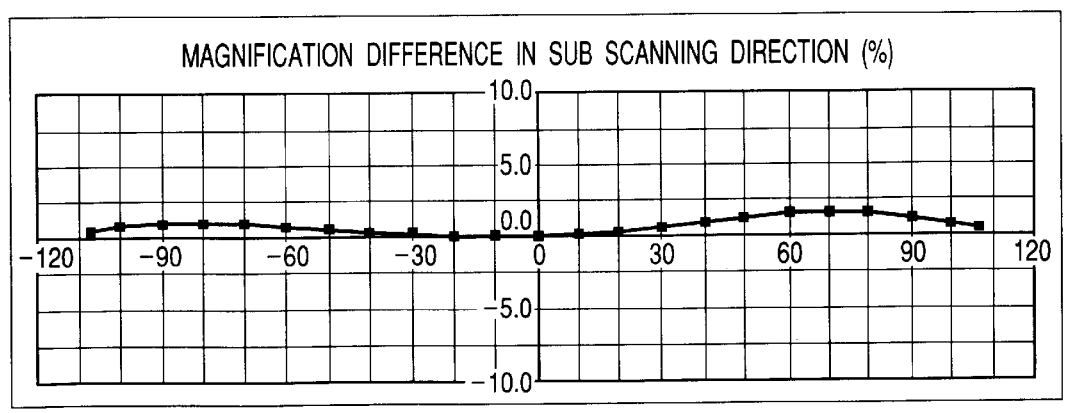

FIG. 15 shows the curvatures of field in the main scanning direction and the sub scanning direction, the fθ characteristic, and the sub scanning magnification of the single fθ lens in this embodiment, with each of these being favorably corrected.

Here, when power of all systems of the single fθ lens in the sub scanning direction is referred to as Φs and power of the exit surface on the optical axis is referred to as Φs2, there is obtained the following relation.

$$\Phi s2/\Phi s=0.929 \tag{16}$$

Also, the following condition is satisfied.

$$0.9 \leq \Phi s2/\Phi s \leq 1.1 \tag{17}$$

There is obtained a relation of Lbθ/Laθ=1.0057×Lb0/La0 and the following condition is satisfied.

$$0.9 \times \frac{L_{bo}}{L_{ao}} \leq \frac{L_{b\theta}}{L_{a\theta}} \leq 1.1 \times \frac{L_{bo}}{L_{ao}}$$

In this embodiment, each of the incident surface and the exit surface of the single fθ lens 61 has a shape in the main scanning direction that is the same as that in the first embodiment, and the incident surface has feeble positive power in the sub scanning direction. However, power is approximately concentrated on the exit surface, so that the relations expressed by Conditional Equations (10) to (15) are not significantly deviated from.

If the distribution of power on the incident surface 61a side is equal to or less than 10% of power of the whole of the single fθ lens, it is substantially possible to obtain the effects of the present invention. Consequently, there is obtained a shape of the incident surface that causes scanning line bending in a direction opposite to scanning line bending caused in the case where the exit surface 61b is rotationally decenter about the axis parallel to the main scanning direction, with these scanning line bendings having the same bending amount. With this construction, there is reduced the sensitivity of the scanning line bending to the rotational decentration of the single fθ lens 61 about the axis parallel to the main scanning direction.

Figure 16:
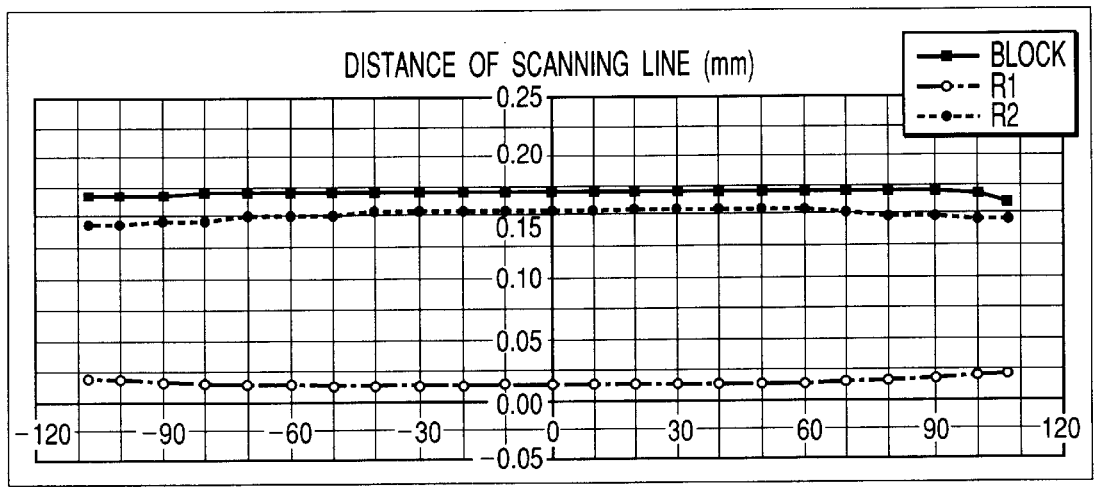
FIG. 16 shows the distance of a scanning line in the third embodiment of the present invention.

FIG. 16 is a drawing showing the distance of a scanning line in the sub scanning direction on a surface to be scanned in the case where the whole of a single fθ lens and each optical surface in this embodiment are decenter by 50 μm in the sub scanning direction. As can be seen from this drawing, although the irradiation position is displaced due to the decentration, the amount of scanning line bending caused is very small.

Figure 17:
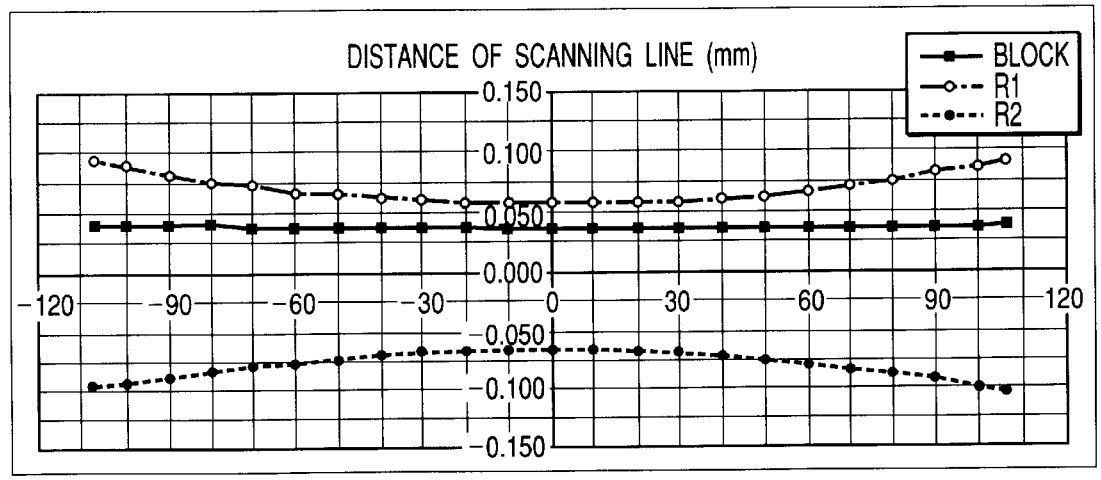
FIG. 17 also shows the distance of a scanning line in the third embodiment of the present invention.

Also, FIG. 17 is a drawing showing the distance of a scanning line in the sub scanning direction in the case where the whole of a single fθ lens and each optical surface in this embodiment are rotationally decenter by trisection about the axis parallel to the main scanning direction.

As can be seen from this drawing, although the irradiation position of the scanning line is displaced, the amount of scanning line bending caused is very small.

Figure 18:
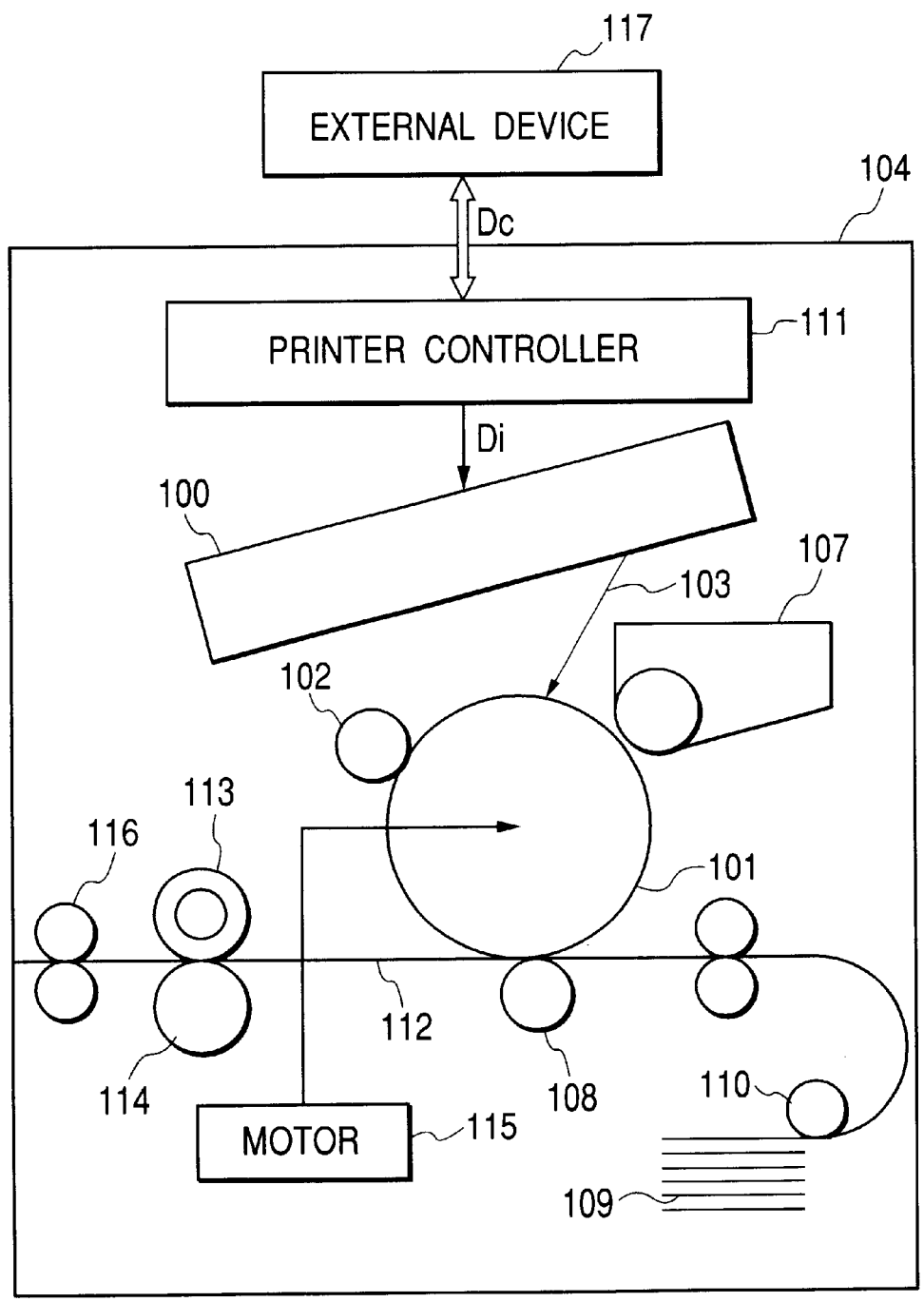
FIG. 18 is a schematic diagram showing the main part of an image forming apparatus of the present invention.

FIG. 18 is a cross-sectional view showing the main portion in the sub scanning direction showing an embodiment of an image forming apparatus of the present invention. In FIG. 18, reference numeral 104 denotes an image forming apparatus. Code data Dc is inputted into this image forming apparatus 104 from an external device 117 such as a personal computer. This code data Dc is converted into image data (dot data) Di by a printer controller 111 within the apparatus. This image data Di is inputted into an optical scanning unit 100 having the construction described in the embodiments. Then, this optical scanning unit 100 emits light beam 103 modulated in accordance with the image data Di and a photosensitive surface of a photosensitive drum 101 is scanned by this light beam 103 in the main scanning direction.

The photosensitive drum 101 that is an electrostatic latent image bearing member (photosensitive member) is rotated in a clockwise direction by a motor 115. Then, in accordance with this rotation, the photosensitive surface of the photosensitive drum 101 moves in the sub scanning direction orthogonal to the main scanning direction with reference to the light beam 103. On the photosensitive drum 101, a charging roller 102 for uniformly charging the surface of the photosensitive drum 101 is provided so as to be abutted against the surface. Also, the light beam 103 scanned by the optical scanning unit 100 is irradiated onto the surface of the photosensitive drum 101 charged by the charging roller 102.

As described above, the light beam 103 has been modulated on the basis of the image data Di and an electrostatic latent image is formed on the surface of the photosensitive drum 101 by the irradiation of this light beam 103. This electrostatic latent image is developed as a toner image by a developing device 107 that is arranged so as to be abutted against the photosensitive drum 101 on the downstream side in the rotational direction of the photosensitive drum 101 with reference to the irradiation position of the light beam 103.

The toner image developed by the developing device 107 is transferred onto a sheet 112 that is a material to be transferred by a transferring roller 108 arranged so as to oppose the photosensitive drum 101 in the lower portion of the photosensitive drum 101. The sheet 112 is contained in a sheet cassette 109 frontward of the photosensitive drum 101 (on the right side in FIG. 18), although it is possible to manually feed a sheet. A feed roller 110 is arranged in an end portion of the sheet cassette 109 and feeds the sheet 112 in the sheet cassette 109 into a convey path.

The sheet 112, onto which an unfixed toner image has been transferred in this manner, is further conveyed to a fixing device arranged to follow the photosensitive drum 101 (on the left side in FIG. 16). The fixing device is composed of a fixing roller 113 including a fixing heater (not shown) and a pressure roller 114 that is arranged so as to be brought into pressure contact with the fixing roller 113. With this construction, the fixing device fixes the unfixed toner image on the sheet 112 conveyed from the transferring unit by applying pressure and heat to the sheet 112 in a pressure contact portion between the fixing roller 113 and the pressure roller 114. Discharging rollers 116 are further arranged to follow the fixing roller 113. After the toner image is fixed on the sheet 112, the discharging rollers 116 discharge the sheet 112 to the outside of the image forming apparatus.

Although not shown in FIG. 16, in addition to the aforementioned data conversion, the printer controller 111 performs control of each component (such as a motor 115) in the image forming apparatus, a polygon motor in an optical scanning unit to be described later, and the like.

Figure 19:
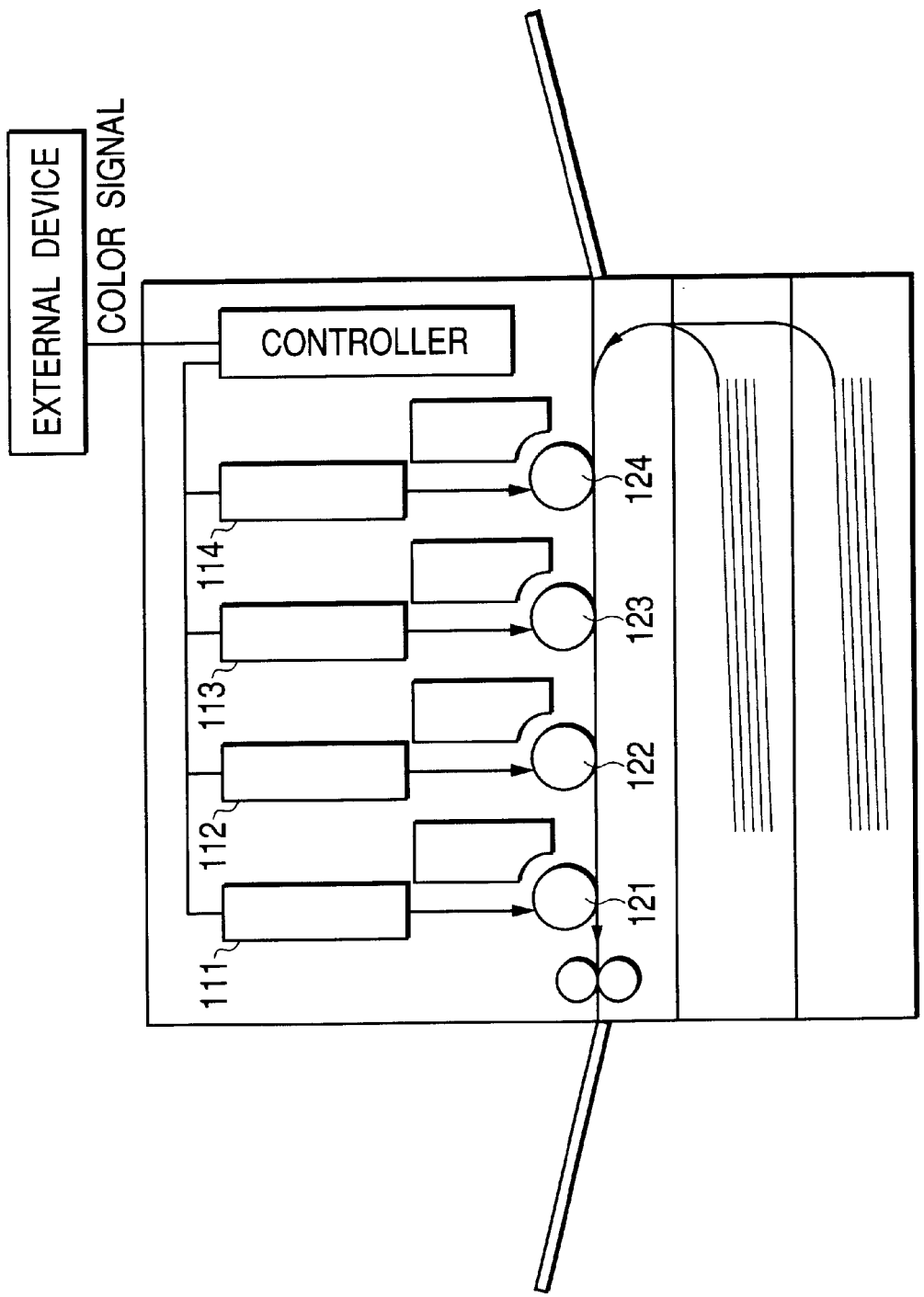
FIG. 19 is a schematic diagram showing the main part of a color image forming apparatus of the present invention.
Figure 20:
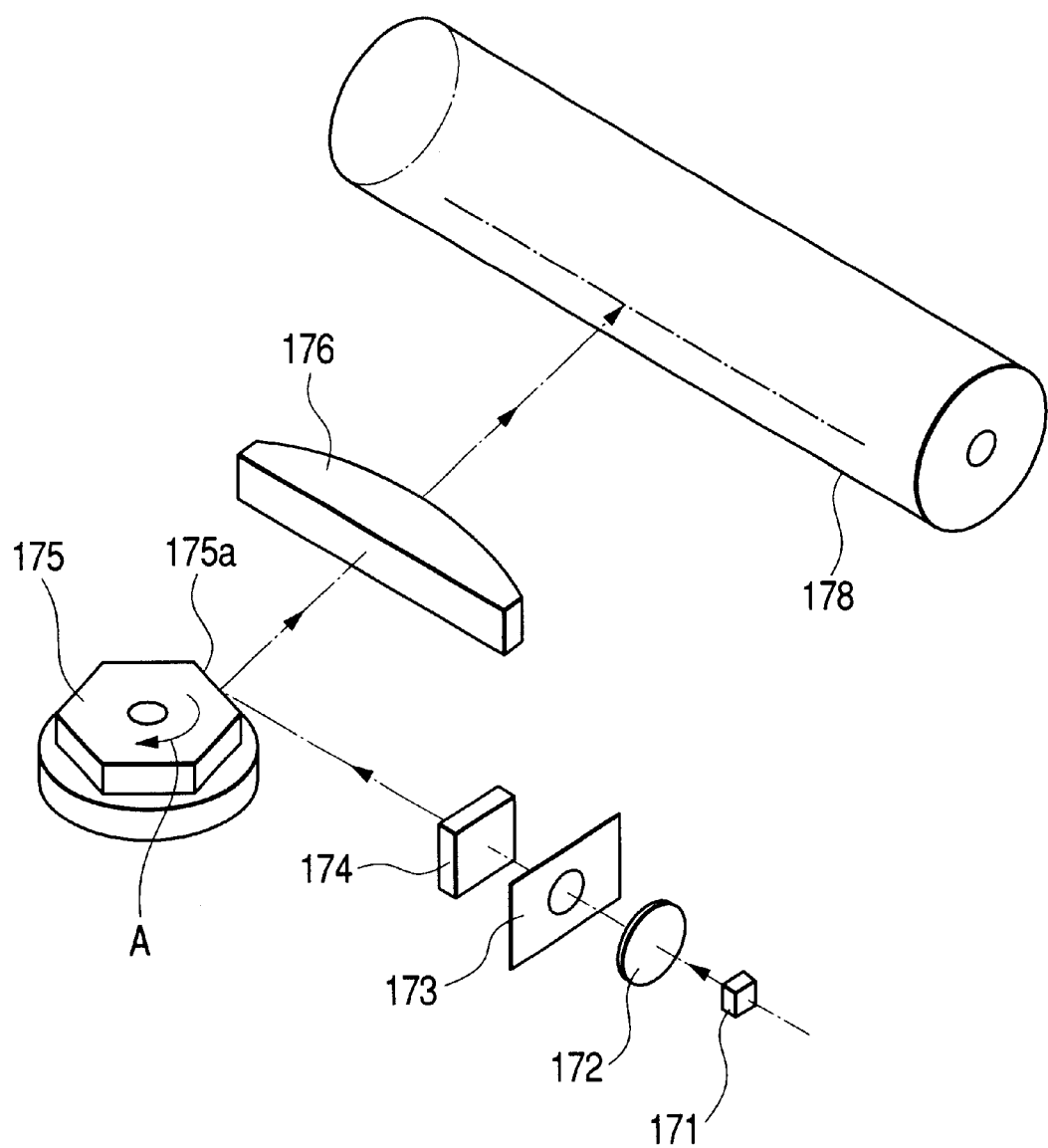
FIG. 20 is a perspective view of a conventional scanning optical apparatus.

FIG. 19 is a schematic diagram showing the main part of a color image forming apparatus of an embodiment of the present invention. This embodiment relates to a color image forming apparatus of tandem type that records image information on surfaces of photosensitive drums that are parallel image bearing members obtained by arranging four scanning optical apparatuses. In FIG. 19, reference numeral 60 represents a color image forming apparatus, each of numerals 11, 12, 13, and 14 indicates a scanning optical apparatus having the construction described in any one of the first to third embodiments, each of numerals 21, 22, 23, and 24 indicates a photosensitive drum that is an image bearing member, each of numerals 31, 32, 33, and 34 indicates a developing device, and numeral 51 indicates a convey belt.

Respective color signals for R (red), G (green), and B (blue) are inputted into the color image forming apparatus 60 shown in FIG. 19 from an external device 52 such as a personal computer. These color signals are converted into respective image data (dot data) for C (cyan), M (magenta), Y (yellow), and B (black) by the printer controller 53 in the apparatus. These image data are inputted into the scanning optical apparatuses 11, 12, 13, and 14, respectively. Then, these scanning optical apparatuses emit light beams 41, 42, 43, and 44 modulated in accordance with respective image data, and the photosensitive surfaces of the photosensitive drums 21, 22, 23, and 24 are scanned by these light beams in the main scanning direction.

In the color image forming apparatus in this embodiment, four scanning optical apparatuses (11, 12, 13, and 14) are arranged so as to correspond to respective colors of C (cyan), M (magenta), Y (yellow), and B (black). These scanning optical apparatuses record image signals (image information) on the surfaces of the photosensitive drums (21, 22, 23, and 24) in parallel. In this manner, a color image is printed at high speed.

The color image forming apparatus in this embodiment forms latent images in respective colors on the surfaces of their corresponding photosensitive drums 21, 2, 23, and 24 using light beams emitted from the four scanning optical apparatuses 11, 12, 13, and 14 on the basis of each image data in the manner described above. Following this, the latent images are transferred onto a recording material so that these latent images are superimposed on each other. In this manner, one full-color image is formed.

There occurs no problem even if a color image reading apparatus including a CCD sensor is used as the external device 52, for instance. In this case, a color digital copying machine is constructed from this color image reading apparatus and the color image forming apparatus 60.

The effect of the present invention is that it becomes possible to provide a scanning optical apparatus in which power in the sub scanning direction is approximately concentrated on an exit surface and there is used a single fθ lens whose exit surface has a shape in the main scanning direction with which the magnification in the sub scanning direction is uniformized within an image effective area. With this construction, even if the single fθ lens is rotated about an axis parallel to the main scanning direction, scanning line bending is reduced.

Also, in the case where a plurality of scanning optical apparatuses described above are placed in a color image forming apparatus, differences in scanning line bending amount between the scanning optical apparatuses are suppressed to small amounts, which makes it possible to realize a color image apparatus in which it is not required to perform difficult adjustment for scanning line bending and color drift is suppressed.

What is claimed is:

1. A scanning optical apparatus comprising:

light source means;

deflection means for deflecting a light flux emitted from said light source means; and a scanning optical system that images the deflected light flux as a spot on a surface to be scanned, wherein said scanning optical system is a single lens, and wherein a surface shape of the single lens is set so that a direction of scanning line bending in a sub scanning direction occurring when an incident surface of the single lens is rotationally decentered about an axis parallel to a main scanning direction is opposite to a direction of scanning line bending in the sub scanning direction occurring when an exit surface of the single lens is rotationally decentered about the axis parallel to the main scanning direction.

2. A scanning optical apparatus according to claim 1, wherein the scanning line bending in the sub scanning direction occurring when the incident surface of the single lens is rotationally decentered about the axis parallel to the main scanning direction cancels out the scanning line bending in the sub scanning direction occurring when the exit surface of the single lens is rotationally decentered about the axis parallel to the main scanning direction.

3. A scanning optical apparatus according to claim 1, wherein when power in the sub scanning direction of the entirety of said scanning optical system is referred to as Φs and power in the sub scanning direction of the exit surface of the single lens is referred to as Φs2, the power in the sub scanning direction of the exit surface of the single lens satisfies a condition of $0.9 \leq \Phi s2/\Phi s \leq 1.1$.

4. A scanning optical apparatus according to claim 3, wherein power in the sub scanning direction of an exit surface of the single lens satisfies a condition of $0.95 \leq \Phi s2/\Phi s \leq 1.05$.

5. A scanning optical apparatus according to claim 1, wherein when an air converted distance from said deflection means to the exit surface of the single lens on an optical axis is referred to as $L_{ao}$, a distance from the exit surface of the single lens to the surface to be scanned is referred to as $L_{bo}$, an off-axis air converted distance from said deflection means to the exit surface of the single lens is referred to as $L_{a\theta}$, and a distance from the exit surface of the single lens to the surface to be scanned is referred to as $L_{b\theta}$, a shape of the exit surface of the single lens in the main scanning direction satisfies the following condition:

$$0.9 \times \frac{L_{bo}}{L_{ao}} \leq \frac{L_{b\theta}}{L_{a\theta}} \leq 1.1 \times \frac{L_{bo}}{L_{ao}}.$$

6. A scanning optical apparatus according to claim 5, wherein a shape of the exit surface of the single lens in the main scanning direction satisfies the following condition:

$$0.95 \times \frac{L_{bo}}{L_{ao}} \leq \frac{L_{b\theta}}{L_{a\theta}} \leq 1.05 \times \frac{L_{bo}}{L_{ao}}.$$

7. A scanning optical apparatus according to claim 1, wherein a light flux forming a linear image that is long in the main scanning direction enters said deflection means.

8. A scanning optical apparatus according to claim 1, wherein the single lens is formed by a molding process.

9. A scanning optical apparatus according to claim 1, wherein at least one of power of the exit surface in the sub scanning direction and power of the incident surface in the sub scanning direction varies without any correlation with a shape in the main scanning direction.

10. A scanning optical apparatus according to claim 1, wherein a radius of curvature of the exit surface in the sub scanning direction varies from on the axis toward off the axis.

11. A scanning optical apparatus according to claim 1, wherein each of the incident surface and the exit surface is an anamorphotic surface.

12. A scanning optical apparatus according to claim 1, wherein a shape of the exit surface of the single lens is circular arc.

13. A scanning optical apparatus according to claim 12, wherein a shape of the exit surface of the single lens in the main scanning direction is a nearly circular arc shape having a center of curvature on the deflection means side.

14. A scanning optical apparatus according to claim 1, wherein a shape of the exit surface of the single lens is non-circular arc.

15. A scanning optical apparatus according to claim 1, wherein a difference between imaging magnifications in the sub scanning direction of said scanning optical system within an image effective area is 10% or less.

16. A scanning optical apparatus according to claim 1, wherein the single lens satisfies the following equations:

$$|\Delta Z_1| = |\Delta Z_{1d} + \Delta Z_{1L} + \Delta Z_{1\phi} + \Delta Z_2| \leq 0.040$$

$$\Delta Z_2 = \Delta X_2 \times \frac{L_{2O}}{fs_{2O}} \times \gamma$$

$$\Delta Z_{1d} = \frac{N-1}{N} \times \frac{1}{\cos^2\phi} \times \left(1 - \frac{L_{2O}}{fs_{2O}}\right) \times \gamma \times (d_\theta - d_o)$$

$$\Delta Z_{1L} = (N-1) \times \frac{1}{\cos^2\phi} \times \gamma \times (L_{2O} - L_{2o})$$

$$\Delta Z_{1\phi} = (N-1) \times L_{2o} \times \gamma \times \tan^2\phi$$

where $\Delta Z_1$ is an amount of scanning line bending in the sub scanning direction, $\Delta X_2$ is a deviation of an exit surface of the single lens, $L_{2o}$ is a distance from the exit surface of the single lens to the surface to be scanned on the optical axis, $L_{2\theta}$ is a distance from the exit surface of the single lens to the surface to be scanned at an angle of view θ, $fs_{2o}$ is a focal length of the exit surface of the single lens in the sub scanning direction on the optical axis, γ is an angle of rotation about the axis parallel to the main scanning direction by which the incident surface and the exit surface of the single lens are rotationally decentered, N is a refractive index of the single lens, $d_o$ is a distance between the incident surface and the exit surface of the single lens on the optical axis, $d_\theta$ is a distance between an incident surface and the exit surface of the single lens at the angle of view θ, and Φ is an inclination of a ray of light after emission from the incident surface in the main scanning direction at the angle of view θ.

17. A scanning optical apparatus according to claim 1, wherein said light source means is a multi-beam light source having a plurality of light-emitting points that are able to be modulated independently of each other.

18. An image forming apparatus comprising:
a scanning optical apparatus according to any one of claims 1 to 17;
a photosensitive member arranged on the surface to be scanned;
a developing device that develops an electrostatic latent image formed on said photosensitive member by a light flux scanned by said scanning optical apparatus as a toner image;
a transferring device that transfers the developed toner image onto a material to be transferred; and
a fixing device that fixes the transferred toner image on the material to be transferred.

19. An image forming apparatus comprising:
a scanning optical apparatus according to any one of claims 1 to 17; and
a printer controller that converts code data inputted from an external device into an image signal and inputs the image signal into said scanning optical apparatus.

20. An image forming apparatus comprising:
a plurality of image bearing members irradiated with a plurality of light flux from the scanning optical apparatuses according to any one of claims 1 to 17 to form images differing in color from one another.

* * * * *

UNITED STATES PATENT AND TRADEMARK OFFICE
CERTIFICATE OF CORRECTION

PATENT NO. : 6,683,707 B2
DATED : January 27, 2004
INVENTOR(S) : Keiichiro Ishihara et al.

It is certified that error appears in the above-identified patent and that said Letters Patent is hereby corrected as shown below:

<u>Title page,</u>
Item [57], ABSTRACT,
Lines 11 and 14, "decenter" should read -- decentered --.

<u>Column 1,</u>
Line 17, "an" should read -- a --.

<u>Column 3,</u>
Line 21, "decenterity" should read -- decentering --.
Lines 38, 41, 47 and 50, "decenter" should read -- decentered --.

<u>Column 4,</u>
Line 3, "Lao" should read -- $L_{ao}$ --;
Line 49, "circular" should read -- a circular --; and
Line 53, "non-circular" should read -- a non-circular --.

<u>Column 5,</u>
Line 25, "view 74" should read -- view $\theta$ --.

<u>Column 9,</u>
Lines 4 and 29, "decenter" should read -- decentered --.

<u>Column 10,</u>
Lines 6 and 10, "decenter" should read -- decentered --.

UNITED STATES PATENT AND TRADEMARK OFFICE
CERTIFICATE OF CORRECTION

PATENT NO. : 6,683,707 B2
DATED : January 27, 2004
INVENTOR(S) : Keiichiro Ishihara et al.

It is certified that error appears in the above-identified patent and that said Letters Patent is hereby corrected as shown below:

Column 11,
Lines 3, 12, 25 and 42, "decenter" should read -- decentered --.

Column 19,
Line 58, "circular" should read -- a circular --; and
Line 65, "non-circular" should read -- a non-circular --.

Signed and Sealed this

Twenty-first Day of September, 2004

JON W. DUDAS
*Director of the United States Patent and Trademark Office*